US008112527B2

(12) United States Patent
Kawato

(10) Patent No.: US 8,112,527 B2
(45) Date of Patent: Feb. 7, 2012

(54) VIRTUAL MACHINE MANAGEMENT APPARATUS, AND VIRTUAL MACHINE MANAGEMENT METHOD AND PROGRAM

(75) Inventor: Masahiro Kawato, Tokyo (JP)

(73) Assignee: NEC Corporation, Tokyo (JP)

( * ) Notice: Subject to any disclaimer, the term of this patent is extended or adjusted under 35 U.S.C. 154(b) by 133 days.

(21) Appl. No.: 12/227,481

(22) PCT Filed: May 15, 2007

(86) PCT No.: PCT/JP2007/060312
§ 371 (c)(1),
(2), (4) Date: Nov. 19, 2008

(87) PCT Pub. No.: WO2007/136021
PCT Pub. Date: Nov. 29, 2007

(65) Prior Publication Data
US 2009/0210527 A1    Aug. 20, 2009

(30) Foreign Application Priority Data
May 24, 2006    (JP) .................................. 2006-143626

(51) Int. Cl.
*G06F 15/173* (2006.01)
*G06F 15/177* (2006.01)
(52) U.S. Cl. ........................................ 709/226; 709/220
(58) Field of Classification Search .................. 709/220, 709/223, 226
See application file for complete search history.

(56) References Cited

U.S. PATENT DOCUMENTS

| 7,203,944 | B1 * | 4/2007 | van Rietschote et al. ...... 718/104 |
| 7,577,959 | B2 * | 8/2009 | Nguyen et al. ................. 718/105 |
| 7,607,129 | B2 * | 10/2009 | Rosu et al. ......................... 718/1 |
| 2003/0187915 | A1 * | 10/2003 | Sun et al. ....................... 709/201 |
| 2004/0143664 | A1 * | 7/2004 | Usa et al. ....................... 709/226 |

(Continued)

FOREIGN PATENT DOCUMENTS

JP            10-283210        10/1998

(Continued)

OTHER PUBLICATIONS

M. Hisayuki et al., "Dynamic Load Balancing Using Network Transferable Computer," Distributed Computing Systems Workshops, 2005, 25th IEEE International Conference, pp. 51-57.

(Continued)

*Primary Examiner* — Minh-Chau Nguyen
(74) *Attorney, Agent, or Firm* — Foley & Lardner LLP

(57) ABSTRACT

A virtual machine management apparatus connected to a plurality of server devices via a network generates a new virtual machine on a server device in accordance with a request from a management terminal. At that time, for one or more server devices to which a new virtual machine can be allocated, the virtual machine management apparatus refers to an allocation rule table for storing a score for each of combinations of types of virtual machines. The score indicates appropriateness of a condition that each combination of types of virtual machines is to be allocated to the same server device. Thus, the virtual machine management apparatus computes an index value indicative of appropriateness of a condition that the new virtual machine is to be allocated to the server device. Then the virtual machine management apparatus determines an allocation target for the new virtual machine with reference to the computed index value.

27 Claims, 12 Drawing Sheets

U.S. PATENT DOCUMENTS

| | | |
|---|---|---|
| 2005/0050200 A1 | 3/2005 | Mizoguchi |
| 2005/0198303 A1* | 9/2005 | Knauerhase et al. ......... 709/227 |
| 2006/0069761 A1* | 3/2006 | Singh et al. .................... 709/222 |
| 2007/0204266 A1* | 8/2007 | Beaty et al. ....................... 718/1 |

FOREIGN PATENT DOCUMENTS

| | | |
|---|---|---|
| JP | 2002-259147 A | 9/2002 |
| JP | 2004-133764 A | 4/2004 |
| JP | 2005-100387 A | 4/2005 |
| JP | 2005-115653 A | 4/2005 |

OTHER PUBLICATIONS

P. Ruth et al., VioCluster: Virtualization for Dynamic Computational Domains, Cluster Computing, 2005, IEEE International, pp. 1-10.

* cited by examiner

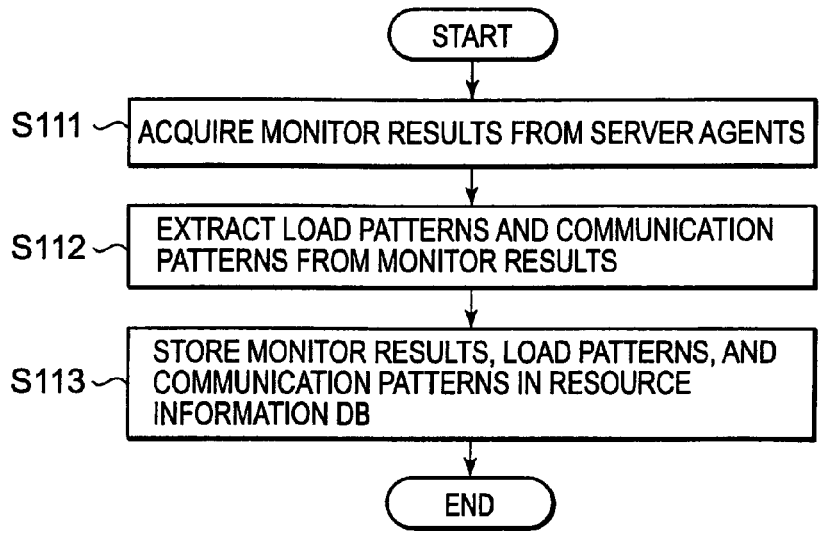

FIG. 3

| HOST NAME | CPU | PHYSICAL MEMORY CAPACITY | HOST OS |
|---|---|---|---|
| Host01 | Xeon | 4GB | Windows |
| Host02 | Opteron | 2GB | Linux |
| Host03 | UltraSparc T1 | 8GB | Solaris |

FIG. 4

| VM NAME | HOST NAME | ALLOCATED CPU USAGE RATIO | ALLOCATED MEMORY USAGE | GUEST OS | SERVICE NAME |
|---|---|---|---|---|---|
| Vm01 | Host01 | 40% | 1.5GB | Windows | SHOPPING SERVICE |
| Vm02 | Host01 | 40% | 1.5GB | Linux | BLOG SERVICE |
| Vm03 | Host02 | 50% | 1GB | Linux | LOG ANALYSIS SERVICE |
| Vm04 | Host02 | 40% | 1GB | Linux | PRODUCT INFORMATION DB |
| Vm05 | Host03 | 20% | 2GB | Solaris | BILLING SERVICE |
| Vm06 | Host04 | 30% | 2GB | Solaris | ACCESS LOG |

FIG. 5

|  | LOAD PATTERN | | COMMUNICATION PATTERN |
|---|---|---|---|
| SERVICE NAME | AVERAGE / MAXIMUM CPU USAGE RATIOS | AVERAGE / MAXIMUM MEMORY USAGES | CONNECTING SERVICE/ CONNECTION FREQUENCY |
| SHOPPING SERVICE | 5%/30% | 200MB / 500MB | PRODUCT INFORMATION DB / 8.5, BILLING SERVICE / 1.2, ACCESS LOG / 3.8 |
| BLOG SERVICE | 2%/50% | 150MB / 2MB | - |
| LOG ANALYSIS SERVICE | 1%/90% | 200MB / 4MB | ACCESS LOG / 9.0 |
| BILLING SERVICE | 1%/12% | 100MB / 300MB | SHOPPING SERVICE / 1.2 |
| PRODUCT INFORMATION DB | 3%/40% | 500MB / 2.6MB | SHOPPING SERVICE / 8.5 |
| ACCESS LOG | 8%/10% | 340MB / 450MB | SHOPPING SERVICE / 3.8, LOG ANALYSIS SERVICE / 9.0 |

FIG. 6

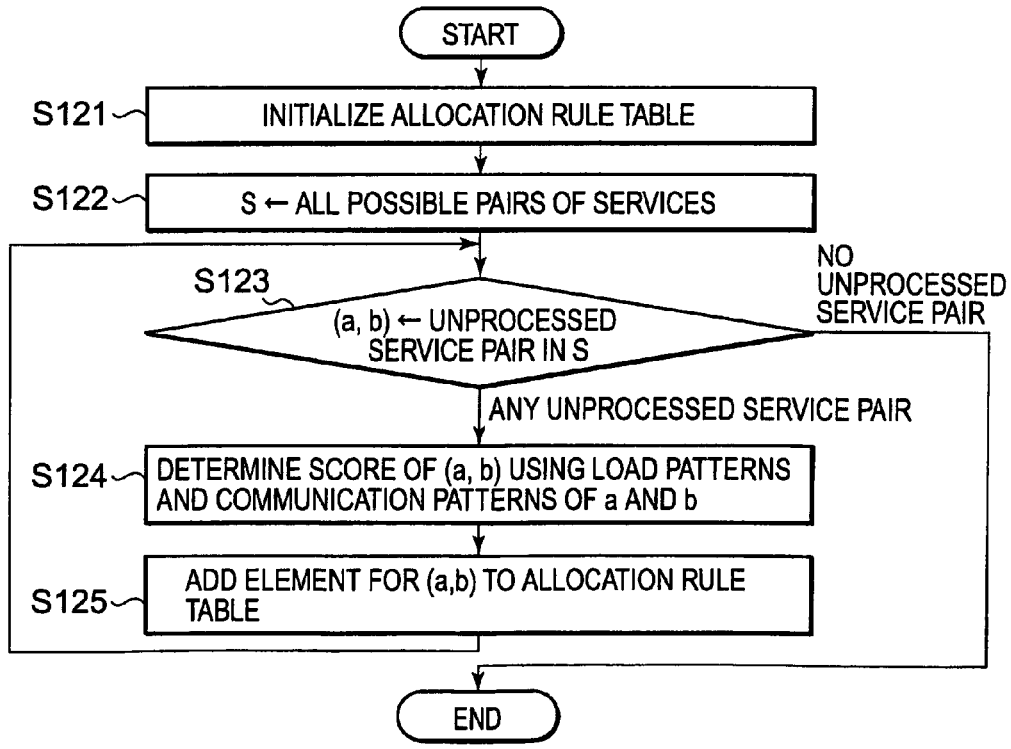

FIG. 7

|  | SHOPPING SERVICE | BLOG SERVICE | LOG ANALYSIS SERVICE | BILLING SERVICE | PRODUCT INFORMATION DB | ACCESS LOG |
|---|---|---|---|---|---|---|
| SHOPPING SERVICE | -3 | -1 | 0 | -1 | -2 | +1 |
| BLOG SERVICE |  | -5 | -3 | -2 | -6 | -1 |
| LOG ANALYSIS SERVICE |  |  | -6 | -2 | -6 | +2 |
| BILLING SERVICE |  |  |  | -2 | -5 | -2 |
| PRODUCT INFORMATION DB |  |  |  |  | -6 | -4 |
| ACCESS LOG |  |  |  |  |  | -1 |

VIRTUAL MACHINE MANAGEMENT APPARATUS, AND VIRTUAL MACHINE MANAGEMENT METHOD AND PROGRAM

This application is the National Phase of PCT/JP2007/060312, filed May 15, 2007, which claims priority to Japanese Application No. 2006-143626, filed May 24, 2006, the disclosures of which are hereby incorporated by reference in their entirety.

TECHNICAL FIELD

The present invention relates to a virtual machine management apparatus and a virtual machine management method, and more particularly to a virtual machine management apparatus and a virtual machine management method for dynamically determining a method of allocating virtual machines to physical machines based on load characteristics of programs operated on the virtual machines.

BACKGROUND ART

There has heretofore been known a virtual machine (VM) technique capable of virtually using one computer as a plurality of servers by operating a plurality of operating systems (OS) on a single server device. Here, the single server device refers to a computer such as a workstation or a personal computer. Products to which this type of technology is applied include "VMWare ESX Server" by VMWare, Inc., "Virtual Server" by Microsoft Corporation, "Xen" by XenSource, Inc. in the United States, and the like. With those products, a new virtual machine can be generated on a server device by issuing a command for generating a VM.

Further, in a distributed-processor environment in which a plurality of server devices are connected via a network, there has been known a technique to transfer a virtual machine generated on one server device to another server device. For example, documents disclosing migration technology of a virtual machine include Japanese Unexamined Patent Application Publication No. 10-283210 (hereinafter referred to as "Patent Document 1"). Furthermore, VMware provides a migration function for a virtual machine as "vMotion," and Xen provides a transfer function for a virtual machine as "migration."

Thus, in an environment in which a plurality of server devices are distributed, a method of randomly selecting a server device having enough resources has heretofore been employed to newly generate a virtual machine, as disclosed by Japanese Unexamined Patent Application Publication No. 2005-115653 (hereinafter referred to as "Patent Document 2"). According to Patent Document 2, if there is no server device having enough resources, generation of a new virtual machine is abandoned, and an error message is displayed. Furthermore, according to Patent Document 2, data indicative of the performance of existing virtual machines are measured at predetermined intervals asynchronous with generation of a new virtual machine, and a combination of virtual machines and server devices that maximizes the total performance of the virtual machines at those intervals is computed based on the measured data on the assumption that each of the virtual machines is operated on one of a plurality of the server devices. Reallocation of the virtual machines is performed based on the computed combination.

As described above, the conventional technique randomly selects a server device having enough resources at the time of generating a new virtual machine and generates a virtual machine on the selected server device. Accordingly, the conventional technique has the following problems.

A first problem is that a newly generated virtual machine is unlikely to exhibit satisfactory performances and is likely to exert an adverse influence on other existing virtual machines. This is because a probability that a server device randomly selected will be one optimum for generation of a new virtual machine is considerably low.

A second problem is that there is a great possibility that a new virtual machine cannot be generated. This is because a new virtual machine cannot be generated if there is no server device having enough resources.

DISCLOSURE OF INVENTION

A first exemplary object of the present invention is to generate a virtual machine on a proper server device.

A second exemplary object of the present invention is to generate as many virtual machines as possible.

A first virtual machine management apparatus according to the present invention is connected to a plurality of server devices via a network and is characterized by comprising: an allocation rule table for storing a score for each of combinations of types of virtual machines, the score indicating appropriateness of a condition that the combination of types of virtual machines is to be allocated to the same server device; and a virtual machine allocation determination unit for selecting one or more server devices to which a new virtual machine can be allocated, for computing an index value in a case where the new virtual machine is allocated to each of the selected server devices with use of the score, and for determining an allocation target for the new virtual machine with reference to the computed index value.

A second virtual machine management apparatus according to the present invention is characterized by selecting a server device that can ensure a resource required for the new virtual machine at present as a server device to which the new virtual machine can be allocated, in the first virtual machine management apparatus.

A third virtual machine management apparatus according to the present invention characterized by comprising a virtual machine migration determination unit for migrating an existing virtual machine on one server device to another server device to generate a server device to which the new virtual machine can be allocated when the virtual machine migration determination unit is called by the virtual machine allocation determination unit, in the second virtual machine management apparatus.

A fourth virtual machine management apparatus according to the present invention is characterized in that the virtual machine migration determination unit computes, for each of possible migration methods that can generate a server device to which the new virtual machine can be allocated, an index value of appropriateness of the migration method with reference to the score, and determines a migration method for a virtual machine with reference to the computed index value, in the third virtual machine management apparatus.

A fifth virtual machine management apparatus according to the present invention is characterized in that the virtual machine allocation determination unit calls the virtual machine migration determination unit when there is no server device that can ensure a resource required for the new virtual machine at present, in the third or fourth virtual machine management apparatus.

A sixth virtual machine management apparatus according to the present invention is connected to a plurality of server devices via a network and is characterized by comprising: an allocation rule table for storing a score for each of combinations of types of virtual machines, the score indicating appropriateness of a condition that the combination of types of virtual machines is to be allocated to the same server device; and a virtual machine allocation/migration determination unit for selecting possible allocation methods for a new virtual machine that involve no migration of an existing virtual machine and possible allocation methods for a new virtual machine that involve migration of an existing virtual machine, for computing, for each of the selected possible allocation methods, an index value indicative of appropriateness of the allocation method with use of the score, and for determining an allocation target for the new virtual machine with reference to the computed index value.

A seventh virtual machine management apparatus according to the present invention is characterized by comprising a transfer unit for computing, for each of possible migration methods of migrating a virtual machine on one server device to another server device, an index value indicative of appropriateness of the migration method with reference to the score independently of the allocation of the new virtual machine, and for migrating an existing virtual machine with reference to the computed index value, in the first or sixth virtual machine management apparatus.

An eighth virtual machine management apparatus according to the present invention is characterized in that the migration unit operates at predetermined intervals, or each time a resource of a server device or a virtual machine reaches a predetermined condition, or each time a virtual machine is stopped, in the seventh virtual machine management apparatus.

A ninth virtual machine management apparatus according to the present invention is characterized by comprising: a server monitor unit for collecting, for each type of virtual machines, status of usage of a resource in the virtual machine and status of communication of the virtual machine with other virtual machines from a server device to which that type of virtual machines is allocated; and an allocation rule generation unit for generating the score from the information collected by the server monitor unit and a predetermined score generation rule and for storing the score in the allocation rule table, in the first or sixth virtual machine management apparatus.

A first virtual machine management method according to the present invention is a method of managing virtual machines on a plurality of server devices with a computer connected to the plurality of server devices via a network and is characterized by comprising: a first step in which the computer selects one or more server devices to which a new virtual machine can be allocated; a second step in which the computer computes, for each of the selected server devices, an index value in a case where the new virtual machine is allocated to the selected server device with reference to a score for each of combinations of types of virtual machines from an allocation rule table, the score indicating appropriateness of a condition that the combination of types of virtual machines is to be allocated to the same server device; and a third step in which the computer determines an allocation target for the new virtual machine with reference to the computed index value.

A second virtual machine management method according to the present invention is characterized in that the first step comprises selecting a server device that can ensure a resource required for the new virtual machine at present as a server device to which the new virtual machine can be allocated, in the first virtual machine management method.

A third virtual machine management method according to the present invention is characterized in that the first step comprises attempting to generate a server device to which the new virtual machine can be allocated by migrating an existing virtual machine on one server device to another server device when there is no server device that can ensure a resource required for the new virtual machine at present, in the second virtual machine management method.

A fourth virtual machine management method according to the present invention is characterized in that the first step comprises computing, for each of possible migration methods that can generate a server device to which the new virtual machine can be allocated, an index value of appropriateness of the migration method with reference to the score, and determining a migration method for a virtual machine with reference to the computed index value, in the third virtual machine management method.

A fifth virtual machine management method according to the present invention is a method of managing virtual machines on a plurality of server devices with a computer connected to the plurality of server devices via a network and is characterized by comprising: a first step in which the computer selects possible allocation methods for a new virtual machine that involve no migration of an existing virtual machine and possible allocation methods for a new virtual machine that involve migration of an existing virtual machine; a second step in which the computer computes, for each of the selected possible allocation methods, an index value indicative of appropriateness of the allocation method with reference to a score for each of combinations of types of virtual machines from an allocation rule table, the score indicating appropriateness of a condition that the combination of types of virtual machines is to be allocated to the same server device; and a third step in which the computer determines an allocation target for the new virtual machine with reference to the computed index value.

A sixth virtual machine management method according to the present invention is characterized by further comprising a fourth step in which the computer computes, for each of possible migration methods of migrating a virtual machine on one server device to another server device, an index value indicative of appropriateness of the migration method with reference to the score independently of the allocation of the new virtual machine, and migrates an existing virtual machine with reference to the computed index value, in the first or fifth virtual machine management method.

A seventh virtual machine management method according to the present invention is characterized in that the fourth step is started at predetermined intervals, or each time a resource of a server device or a virtual machine reaches a predetermined condition, or each time a virtual machine is stopped, in the sixth virtual machine management method.

An eighth virtual machine management method according to the present invention is characterized by further comprising: a fifth step in which the computer collects, for each type of virtual machines, status of usage of a resource in the virtual machine and status of communication of the virtual machine with other virtual machines from a server device to which that type of virtual machines is allocated; and a sixth step in which the computer generates the score from the collected information and a predetermined score generation rule and stores the score in the allocation rule table, in the first or fifth virtual machine management method.

According to the present invention, a score for each of combinations of types of virtual machines is used. The score indicates appropriateness of a condition that the combination of types of virtual machines is to be allocated to the same server device. For each of one or more server devices to which a new virtual machine can be allocated, an index value indicative of appropriateness of a condition that the new virtual machine is to be allocated to that server is computed. An allocation target for the new virtual machine is determined with reference to the computed index value. Thus, as compared to a case in which a server device having enough resources is randomly selected, the new virtual machine can be allocated to a proper server device.

For example, for each type of virtual machines, status of usage of a resource in the virtual machine and status of communication of the virtual machine with other virtual machines may be collected from a server device to which the type of virtual machines is allocated. The aforementioned score may be generated from the collected information and a predetermined score generation rule. For example, the score generation rule may be a rule to output a higher score in a case of less resource conflicts and more communications with each other.

One or more possible server devices to which a new virtual machine is to be allocated may be limited to server devices that can ensure a resource required for the new virtual machine at present. However, when server devices to which the new virtual machine can be allocated by migrating an existing virtual machine to another server device are included in the possible server devices, a possibility of success in allocation of the new virtual machine can be enhanced. At that time, only when there is no server device that can ensure a resource required for the new virtual machine at present, generation of a server device to which the new virtual machine can be allocated may be attempted by migrating an existing virtual machine to another server device. In such a case, influence on existing virtual machines can be reduced at the time of allocation of the new virtual machine. Furthermore, when one or more possible server devices to which a new virtual machine can be allocated are selected, allocation methods for the new virtual machine that involve no migration of an existing virtual machine and allocation methods for the new virtual machine that involve migration of an existing virtual machine may be selected. Moreover, a virtual machine on a server device may be transfer to another server device independently of allocation of the new virtual machine.

According to the present invention, a new virtual machine can be generated on a proper server device, i.e., on a server device on which a newly generated virtual machine can exert satisfactory performance with less adverse effects to other existing virtual machines. This is because, for each of one or more server devices to which a new virtual machine can be allocated, an index value indicative of appropriateness of a condition that the new virtual machine is to be allocated to the server device is computed, and an allocation target for the new virtual machine is determined with reference to the computed index value.

Furthermore, when one or more possible server devices to which a new virtual machine can be allocated include not only server devices that can ensure a resource required for the new virtual machine at present, but also server devices to which the new virtual machine can be allocated by migrating an existing virtual machine to another server device, a possibility of failure in generation of the new virtual machine can be reduced.

BRIEF DESCRIPTION OF DRAWINGS

FIG. 3 is a flow chart showing operational procedures of a server monitor unit in the virtual machine management apparatus according to the first exemplary embodiment of the present invention.

FIG. 4 is a diagram showing an example of server device information stored in a resource information DB of the virtual machine management apparatus according to the first exemplary embodiment of the present invention.

FIG. 5 is a diagram showing an example of virtual machine information stored in the resource information DB of the virtual machine management apparatus according to the first exemplary embodiment of the present invention.

FIG. 6 is a diagram showing an example of service information stored in the resource information DB of the virtual machine management apparatus according to the first exemplary embodiment of the present invention.

FIG. 7 is a flow chart showing operational procedures of a VM allocation rule generation unit in the virtual machine management apparatus according to the first exemplary embodiment of the present invention.

BEST MODE FOR CARRYING OUT THE INVENTION

Next, the best mode for carrying out the present invention will be described in detail with reference to the drawings.

Figure 1:
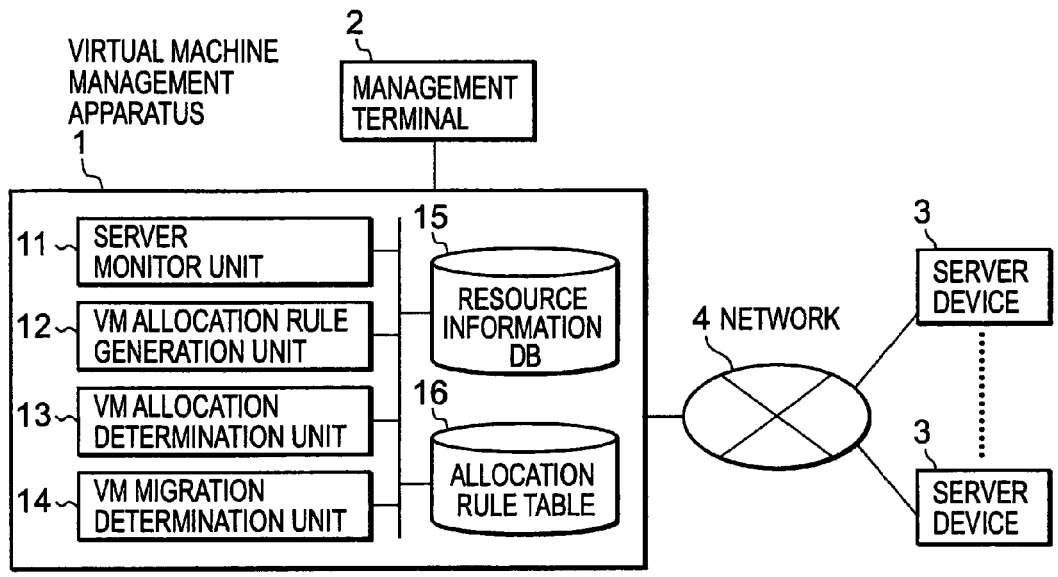
FIG. 1 is a block diagram of an information processing system including a virtual machine management apparatus according to a first exemplary embodiment of the present invention.

Referring to FIG. 1, an information processing system according to a first exemplary embodiment of the present invention comprises a virtual machine management apparatus 1, a management terminal 2, a plurality of server devices 3, and a network 4.

The virtual machine management apparatus 1 is a computer operated by a program control and comprises a server monitor unit 11, a VM (Virtual Machine) allocation rule generation unit 12, a VM allocation determination unit 13, a VM migration determination unit 14, a resource information DB (Database) 15, and an allocation rule table 16.

The server monitor unit 11 acquires operation status of the respective server devices 3, the virtual machines, and the services, which constitute the information processing system to be managed, by using a server agent, which will be described later, in each of the server devices 3. Then, the server monitor unit stores those data in the resource information DB 15. Here, one or more application software programs are operated on each of the virtual machines. A group of application software operated on a single virtual machine is referred to as a service. Those services are distinguished by their names. The same service may be operated on a plurality of virtual machines. Thus, each virtual machine and a service operated on that virtual machine have one-to-one correspondence. Accordingly, determination of how to allocate the virtual machines is equivalent to determination of how to allocate the services. Furthermore, the types of virtual machines are equivalent to the types of services.

For each of combinations of the types of services (the types of virtual machines), the VM allocation rule generation unit 12 generates a score indicative of the appropriateness of a condition that such a combination of the types of services (the types of virtual machines) is to be allocated to the same server device 3, based on the information stored in the resource information DB 15. Then, the VM allocation rule generation unit stores those data in the VM allocation rule table 16.

The VM allocation determination unit 13 determines a server device 3 as an allocation target for a new virtual machine to be generated, based on the server device information and the virtual machine information stored in the resource information DB 15 and the contents of the VM allocation rule table 16.

The VM migration determination unit 14 migrates an operating virtual machine to another server device 3 in order to ensure resources necessary for starting a new virtual machine.

The management terminal 2 is a terminal (console) which comprises an input device such as a keyboard or a mouse and an output device such as a display. The management terminal 2 has a function of connecting to the virtual machine management apparatus 1 to transmit various operations inputted by an operation manager to the virtual machine management apparatus 1 and a function of receiving execution status of the various operations and operation status of the information system from the virtual machine management apparatus 1 to output those data to the output device. Here, the various operations include generation of a new virtual machine and discard of an operating virtual machine.

Figure 2:
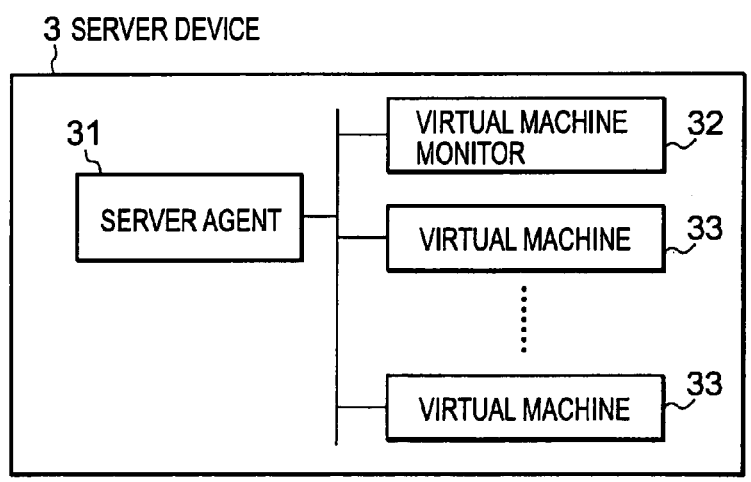
FIG. 2 is a block diagram showing an internal structure of a server device in the information processing system according to the first exemplary embodiment of the present invention.

The server device 3 is a computer operated by a program control. Referring to FIG. 2, each of the server devices 3 comprises a server agent 31, a virtual machine monitor (Hypervisor) 32, and a plurality of virtual machines 33.

The server agent 31 has a function of acquiring operation status of hardware and software from the virtual machine monitor 32 and the virtual machines 33 and a function of requesting the virtual machine monitor 32 to generate and discard a virtual machine and to migrate a virtual machine to another server device 3.

The virtual machine monitor 32 has a function of allocating hardware resources such as a CPU (Central Processing Unit) and a memory (Main Memory) provided in the server device 3 to the respective virtual machines 33 and of controlling generation and discard of the virtual machines 33.

As described above, one type of services (one or more application software programs) is operated on each of the virtual machines 33.

The network 4 is a network which connects the virtual machine management apparatus 1 and the plurality of server devices 3. Although the management terminal 2 is not connected to the network 4 in FIG. 1, the nature of the present invention is not affected by connecting the management terminal 2 to the virtual machine management apparatus 1 via the network 4.

Specific Examples of the Arrangement in the Present Embodiment

Specific examples of the arrangement in the present embodiment will be described below.

A specific example of the virtual machine management apparatus 1 is a computer which comprises a network connection unit such as Ethernet (registered trademark) and which operates on an OS such as Windows (registered trademark) or Linux. Furthermore, each of the server monitor unit 11, the VM allocation rule generation unit 12, the VM allocation determination unit 13, and the VM migration determination unit 14 is operated as a software module on the OS. The resource information DB 15 and the allocation rule table 16 employ DB products such as Oracle, DB2, or MySQL, or software modules for storing resource information and information on an allocation rule (scores) in a memory. Interaction between the respective units 11-14, the resource information DB 15, and the allocation rule table 16 is implemented by using functions of a programming language (including a function, a procedure, a subroutine, and a method). Alternatively, the interaction may be implemented by combining a communications protocol such as TCP/IP with an upper level communications protocol such as HTTP (HyperText Transfer Protocol) or SOAP (Simple Object Access Protocol).

A specific example of the management terminal 2 is a terminal device which comprises an input device including a keyboard and a mouse, a liquid crystal display device, a unit for connecting to the virtual machine management apparatus 1. A typical example of this terminal is a personal computer (PC) on which Windows is operated. The terminal connects to the virtual machine management apparatus 1 via a web browser such as Internet Explorer. In the present example as shown in FIG. 1, the management terminal 2 is directly connected to the virtual machine management apparatus 1. However, it is not necessary to connect the management terminal directly to the virtual machine management apparatus. Thus, the management terminal 2 may be connected to the network 4.

A specific example of the server device 3 is a computer comprising a network connection unit such as Ethernet (registered trademark). The virtual machine monitor 32 such as VMware GSX Server, VMware ESX Server, or Xen and one or more virtual machines 33 controlled by the virtual machine monitor 32 are operated on the server device. Furthermore, a web server such as Internet Information Server or Apache HTTP Server, an application container such as Enterprise Java (registered trademark) Beans (EJB), and a database management system (DBMS) such as Oracle, DB2, or MySQL are operated as services on the server device.

The configuration of the server agent 31 on the server device 3 depends upon the type of virtual machine monitor 32. In a case of the virtual machine monitor 32 operated on a host OS, such as VMware GSX Server, the server agent 31 is operated as software on the host OS. On the other hand, in a case of the virtual machine monitor 32 that does not require a host OS, such as VMware ESX Server or Xen, the server agent 31 is operated as a software module in the virtual machine monitor 32 or the server agent 31 is operated as a process on a privileged virtual machine such as Xen Domain0.

A specific example of the network 4 is a local area network (LAN) using Ethernet (registered trademark) or the Internet.

Next, the entire operation of the present exemplary embodiment will be described below with reference to flow charts.

Operational Procedures of the Server Monitor Unit 11

FIG. 3 is a flow chart showing operational procedures of the server monitor unit 11 in the virtual machine management apparatus 1. The procedures include the following steps.

First, the server monitor unit 11 acquires, as operation status, information relating to the server devices 3, the virtual machines 33 operated on those server devices 3, and the services operated on those virtual machines 33 from the server agents 31 provided in the respective server devices 3 managed thereby (Step S111). The operation status thus acquired includes the following types of information:

a) Information relating to the server devices 3, such as hardware resources provided in the respective server devices 3 (hereinafter referred to as "server device information")

b) Names of the virtual machines 33 operated on the respective server devices 3, hardware resources used by the virtual machines 33, and names of the services operated on the virtual machines 33 (hereinafter referred to as "virtual machine information")

c) Communication histories of the respective operating services with other services Next, the server monitor unit 11 sums up indexes for characterizing the respective services (hereinafter referred to as "service information") based on the operation status acquired in Step S111 (Step S112). The service information includes the following two types of indexes.

1) Load pattern: hardware resources used by a service
2) Communication pattern: interaction between one service and another When the same type of services is operated on a plurality of virtual machines, the server monitor unit 11 uses an average value of indexes for those virtual machines as an index for the service.

Next, the server monitor unit 11 stores the server device information and the virtual machine information acquired in Step S111 and the service information summed up in Step S112 in the resource information DB 15 (Step S113).

Specific Examples of the Load Pattern/Communication Pattern

Specific examples of the load pattern and the communication pattern summed up in Step S112 will be described below.

A specific example of the load pattern includes combinations of the following numerical values.

a) An average of CPU usage ratios for a certain past period of time (e.g., 5 minutes) (hereinafter referred to as "average CPU usage ratio")

b) A maximum of CPU usage ratios for a certain past period of time (e.g., 1 hour) (hereinafter referred to as "maximum CPU usage ratio")

c) An average of memory usages for a certain past period of time (e.g., 5 minutes) (hereinafter referred to as "average memory usage")

d) A maximum of memory usages for a certain past period of time (e.g., 1 hour) (hereinafter referred to as "maximum memory usage")

A specific example of the communication pattern includes the number of TCP (Transmission Control Protocol) sessions for a certain past period of time (e.g., 10 minutes) (hereinafter referred to as "connection frequency").

Specific Examples of the Information Stored in the Resource Information DB

Specific examples of the information stored in the resource information DB 15 in Step S113 will be described below.

FIG. 4 shows a specific example of the server device information. In this example, the server devices 3 to be managed include three machines host01, host02, and host03. FIG. 4 shows information on the type of the CPU (Central Processing Unit), the physical memory capacity, and the host OS (Operating System) of the respective server devices 3.

FIG. 5 shows a specific example of the virtual machine information. In this example, with regard to each of six virtual machines 33 including vm01 to vm06, there is stored information including a host name of the server device 3 to which the virtual machine 33 belongs, an allocated CPU usage ratio, an allocated memory usage, a guest OS, and a name of a service operated on the virtual machine 33. Here, the allocated CPU usage ratio and the allocated memory usage mean maximum values of a CPU usage ratio and a memory capacity that are allowed to be used by the virtual machine 33.

FIG. 6 shows a specific example of the service information. In this example, there is stored information including average/maximum CPU usage ratios, average/maximum memory usages, and a connecting service/a connection frequency with regard to six types of services including a shopping service, a blog service (weblog service, blog/weblog service), a log analysis service, a billing service, a product information DB (Database), and an access log.

Here, the average/maximum CPU usage ratios refer to an average value and a maximum value of CPU usage ratios consumed by a service for a certain past period of time. Similarly, the average/maximum memory usages refer to an average value and a maximum value of memory usages by a service for a certain past period of time. The connecting service/the connection frequency refer to a name of a service that has communicated with the service for a certain past period of time and an average value of the number of times of the connections. Inasmuch as the same type of services may be operated on a plurality of virtual machines, the value of the connection frequency is not necessarily an integer.

Operational Procedures of the VM Allocation Rule Generation Unit 12

FIG. 7 is a flow chart showing operational procedures of the VM allocation rule generation unit 12 in the virtual machine management apparatus 1. The VM allocation rule generation unit 12 starts execution of those procedures by a start command from the management terminal 2 or by a timer. Those procedures include the following steps.

First, the VM allocation rule generation unit 12 deletes all information that has been recorded on the allocation rule table 16 and initializes the allocation rule table (Step S121). A pair of two types of services, which may be the same type of services, and a score (point or priority) assigned to that pair are recorded on the allocation rule table 16. The score has a value of an integer or a real number. A greater score represents that the services included in the pair should more preferentially be operated on the same server device 3. The allocation rule table 16 is empty immediately after the execution of Step S121.

Next, the VM allocation rule generation unit 12 reads the service information recorded on the resource information DB 15 and generates a set S of all possible pairs of services included in the service information (Step S122).

Then, the VM allocation rule generation unit 12 takes one service pair out of the set S (Step S123). If all service pairs have been taken out of the set S, the operation of the VM allocation rule generation unit 12 is completed. In the following steps, a service pair taken in this step is denoted by (a, b).

Thereafter, the VM allocation rule generation unit 12 computes a score to be assigned to the service pair (a, b) by using the load patterns and the communication patterns of the services a and b which are recorded on the resource information DB 15 (Step S124). The load patterns and the communication patterns used in this step have been extracted in Step S112 by the server monitor unit 11.

At Step S124, the VM allocation rule generation unit 12 computes a score by applying a function called a "score generation function" to elements in the service information of the resource information DB 15 with regard to the services a and b. The score generation function is defined in a form that meets the following characteristics.

1) A lower score is assigned to a pair of services that more use the same type of hardware resources (e.g., a CPU usage ratio). This is because, if such a pair of services is allocated to the same server device, then resource conflicts frequently occur, so that desired performance cannot be achieved. Furthermore, as the absolute amount of resources used is larger, a lower score is assigned.

2) As a pair of services has a larger degree of interaction, a higher score is assigned to that service pair. This is because the cost of communication and the amount of communication flowing into the network 4 can be reduced if such a pair of services is allocated to the same server device.

In other words, the score generation function is a function to compute a higher score in a case of less resource conflicts and more communications with each other.

Next, the VM allocation rule generation unit 12 adds a combination of the service pair (a, b) taken in Step S123 and the score computed in Step S124 to the allocation rule table 16 (Step S125). The procedures following Step S123 are repeated after this step.

Figures 8, 9:
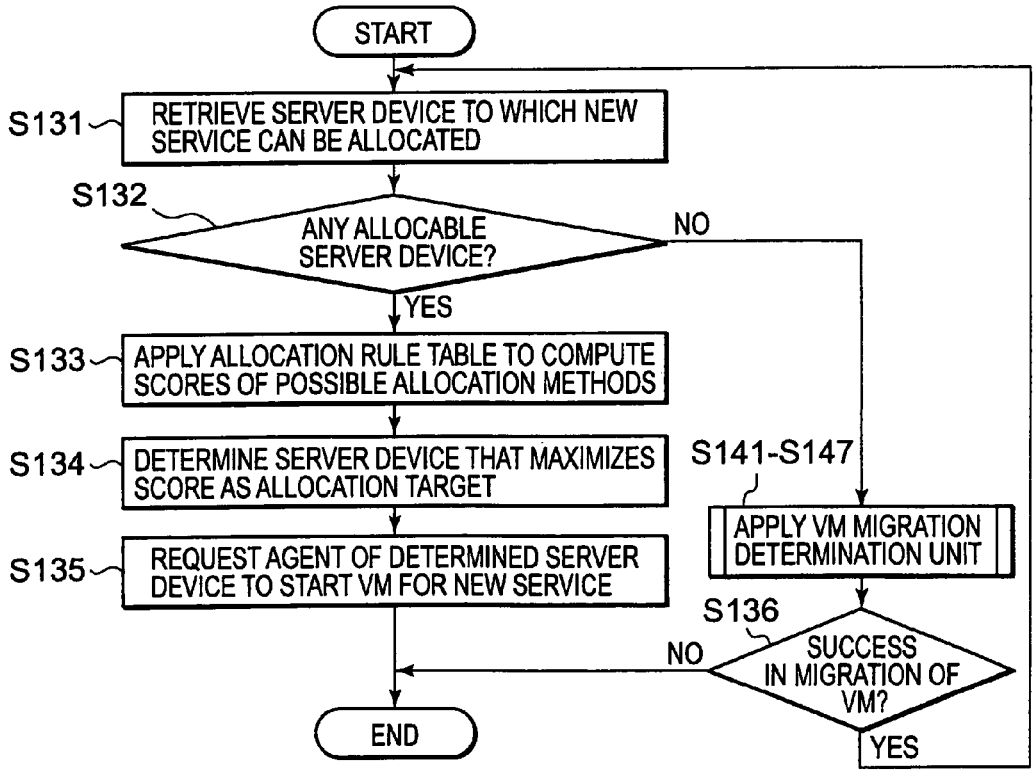
FIG. 8 is a diagram showing an example of information stored in an allocation rule table of the virtual machine management apparatus according to the first exemplary embodiment of the present invention.
FIG. 9 is a flow chart showing operational procedures of a VM allocation determination unit in the virtual machine management apparatus according to the first exemplary embodiment of the present invention.

FIG. 8 shows an example of the allocation rule table 16. In this example, a score is set for each of combinations of any two types of services among six services including a shopping service, a blog service, a log analysis service, a billing service, a product information DB, and an access log.

Operational Procedures of the VM Allocation Determination Unit 13

The VM allocation determination unit 13 has a function of receiving an input of information on a service to be executed on a new virtual machine (the type of service, hardware resources to be used, and the like) from the management terminal 2 and of generating a virtual machine 33 necessary for the service on an optimum server device 3. The information of a service that is provided as an input is referred to as "virtual machine start request."

FIG. 9 is a flow chart showing operational procedures of the VM allocation determination unit 13 in the virtual machine management apparatus 1. Those procedures include the following steps.

First, the VM allocation determination unit 13 performs retrieval on the server device information and the virtual machine information recorded on the resource information DB 15 and obtains a list of server devices 3 that meet conditions included in the virtual machine start request (Step S131).

Here, specific examples of the contents of the virtual machine start request and the process in Step S131 corresponding thereto are shown below. For example, it is assumed that a virtual machine start request including the following contents is supplied to the VM allocation determination unit 13.

a) The service name: "Shopping service"
b) The type of the CPU: Xeon
c) The allocated CPU usage ratio: 20%
d) The allocated memory usage: 256 MB (Megabytes)

Server devices 3 to be obtained in Step S131 should meet both of the following conditions (1) and (2).

(1) The item of the type of the CPU in the server device information should match the type of the CPU in the virtual machine start request (i.e., Xeon). In the case of the server device information shown in FIG. 4, host01 meets this condition.

(2) The free CPU ratio and the free memory usage should be equal to or above the allocated CPU usage ratio (20%) and the allocated memory usage (256 MB) in the virtual machine start request.

The free CPU ratio and the free memory usage of a server device 3 are computed by the following formulas.

The free CPU ratio=100−(the total of the allocated CPU usage ratios of the virtual machines operated on the server device)

The free memory usage=(the physical memory capacity of the server device)−(the total of the allocated memory usages of the virtual machines operated on the server device)

Therefore, in the case of the server device information shown in FIG. 4 and the virtual machine information shown in FIG. 5, those values are as follows.

host01:

The free CPU ratio=100−(40+40)=20(%)

The free memory usage=4−(1.5+1.5)=1 (GB(Gigabyte))

host02:

The free CPU ratio=100−(40+50)=10(%)

The free memory usage=2−(1+1)=0 (GB)

host03:

The free CPU ratio=100−(20+30)=50(%)

The free memory usage=8−(2+2)=4 (GB)

Accordingly, two server devices 3 including host01 and host03 meet the conditions relating to the free CPU and the free memory usage. When the first condition is also considered, only host01 is obtained in this step.

Next, the VM allocation determination unit 13 examines whether the retrieval result of Step S131 includes one or more elements, i.e., whether there is a server device 3 to which the service can be allocated (Step S132). If there is a server device 3 to which the service can be allocated, then the procedures following Step S133 are conducted. If not, the VM allocation determination unit 13 attempts to transfer an existing virtual machine 33 by using the VM migration determination unit 14, which will be described later, and then proceeds Step S136. The migration procedures of the existing virtual machine (Steps S141-147) will be described later in detail at the explanation for the "VM migration determination unit 14."

In Step S136, the VM allocation determination unit 13 ascertains whether the VM migration determination unit 14 has succeeded in the transfer of the virtual machine.

In a case where the transfer has been successful, the VM allocation determination unit 13 returns to Step S131 and retries to process the virtual machine start request. In a case where the migration has been failed, i.e., in a case where a server device 3 necessary to execute the virtual machine start request could not be ensured, the VM allocation determination unit 13 fails in the execution of the virtual machine start request and thus ends its process.

In Step S132, if at least one allocable server device 3 is detected, then the VM allocation determination unit 13 selects an allocation target from among those allocable server devices in accordance with the following procedures.

First, the VM allocation determination unit 13 applies the contents of the allocation rule table 16 and computes a score for each of the possible server devices 3 for an allocation target (Step S133). The computation of the score is performed by summing up the scores listed in the allocation rule table 16 with regard to each pair of a new service to be started and each of services operated on the possible server device 3 for an allocation target. For example, it is assumed that a "shopping service" is newly started and that a "billing service" and an "access log" have been operated on a possible server machine for an allocation target. Referring to FIG. 8, the score for the pair of the shopping service and the billing service is −1, and the score for the pair of the shopping service and the access log is +1. Accordingly, the total score is (−1)+(+1)=0. Here, if the allocation rule table 16 does not include a service having the same name as the new service to be started, then the VM allocation determination unit 13 provides a predetermined score (e.g., −1) to all combinations with the existing services.

At Step S134, the VM allocation determination unit 13 selects a server device 3 having the highest score computed in Step S133 as an allocation target for the new service. For example, if two possible server devices for an allocation target have the total scores of −1 and +3, respectively, then the VM allocation determination unit 13 selects the server device having the total score of +3 as an allocation target for the new service.

Next, the VM allocation determination unit 13 requests the server agent 31 of the server device 3 selected in S134 to start a virtual machine 33 for operating the new service and ends its process (Step S135). The generation of the new virtual machine on the server device 3 can be performed by using the known technology, the details of which are omitted herein.

Operational Procedures of the VM Migration Determination Unit 14

Figure 10:
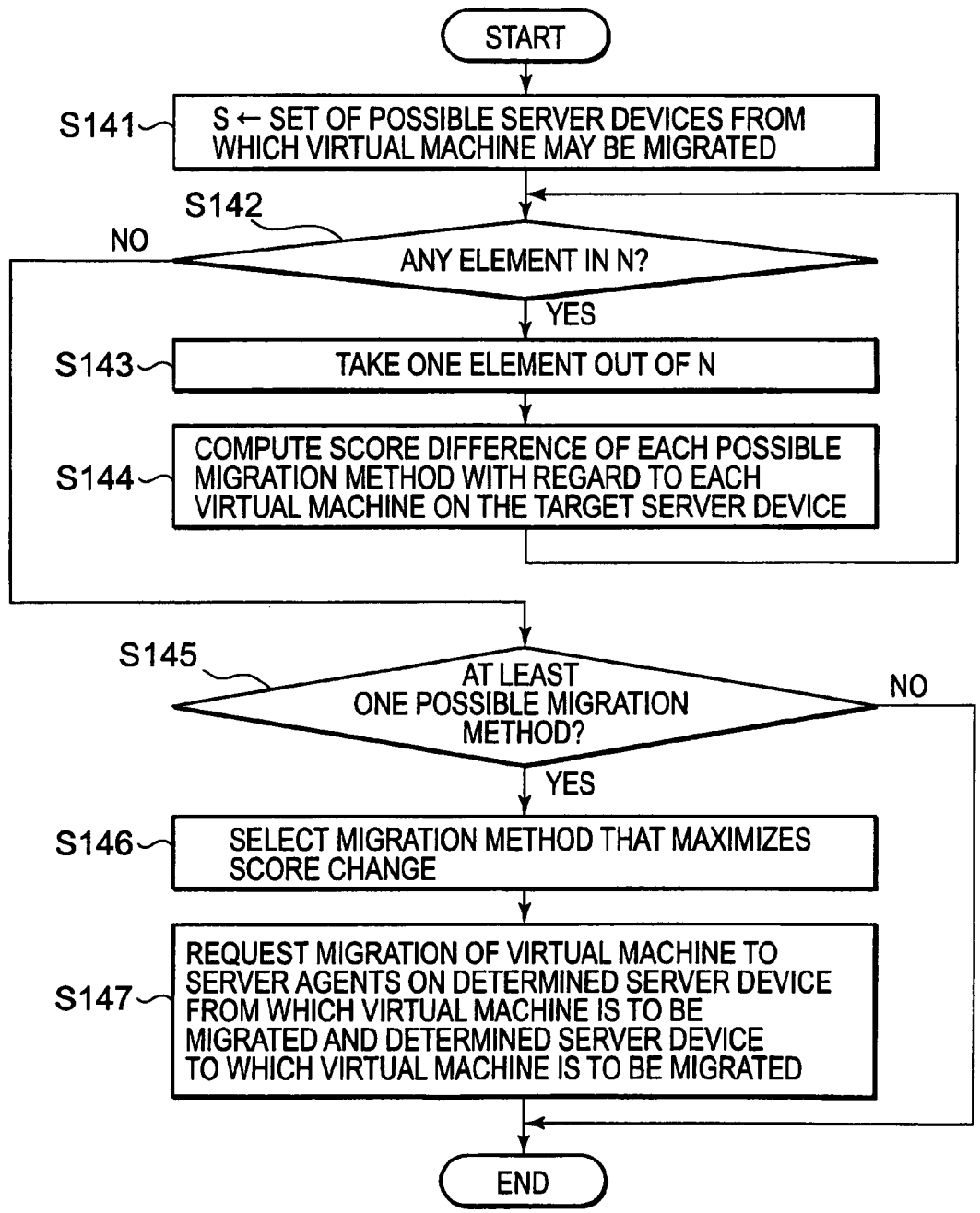
FIG. 10 is a flow chart showing operational procedures of a VM migration determination unit in the virtual machine management apparatus according to the first embodiment of the present invention.

FIG. 10 is a flow chart showing operational procedures of the VM migration determination unit 14 in the virtual machine management apparatus 1. The VM migration determination unit 14 is used when the virtual machine start request received by the VM allocation determination unit 13 cannot be executed under the current virtual machine allocation conditions. (This corresponds to a case where there is no allocable server device 3 in Step S132 of FIG. 9.)

The operational procedures of the VM migration determination unit 14 will be described below with reference to the flow chart in FIG. 10.

First, the VM migration determination unit 14 generates a set of possible server devices 3 from which a virtual machine is to be migrated based on the server device information stored in the resource information DB 15 (Step S141). In the following description, a set of such server devices 3 is denoted by N. Here, the server devices 3 included in N are server devices 3 on which at least one virtual machine is operated and in which resources necessary to generate a new virtual machine can be ensured by migrating the operating virtual machine to another server device 3. For example, in a case of a virtual machine start request including the service name: "shopping service," the type of CPU: Xeon, the allocated CPU usage ratio: 20%, and the allocated memory usage: 256 MB, any server devices 3 having a CPU of Xeon and a physical memory capacity of not less than 256 MB are selected as possible devices from the server device information stored in the resource information DB 15.

Next, the VM migration determination unit 14 examines whether at least one server device 3 is included in N (Step S142). If at least one server device is included in N, then the VM transfer determination unit proceeds Step S143. If not, the VM transfer determination unit proceeds Step S145.

At Step S143, the VM migration determination unit 14 takes information on a single server device 3 out of N. Furthermore, the VM migration determination unit 14 removes the taken information on the server device 3 from N.

Next, the VM migration determination unit 14 computes a score difference of each of possible migration methods with regard to each of the virtual machines 33 operated on the server device 3 taken at S143 (Step S144).

Here, the possible migration methods refer to migration methods capable of ensuring resources necessary for a new virtual machine by migrating a virtual machine and of ensuring resources necessary for the virtual machine to be migrated (i.e., a pair of a virtual machine and a server device to which the virtual machine is to be migrated). One single migration method may include a plurality of pairs of a virtual machine and a server device to which the virtual machine is to be migrated. Specifically, a single migration method includes a case in which a plurality of virtual machines operated on one server device are simultaneously migrated to the same server device or to different server devices. Specific examples of the possible migration methods will be described later.

Furthermore, the score difference refers to a difference of the scores in the allocation rule table 16 between before and after the migration of the existing virtual machine. As a score difference is larger with regard to one migration method, that migration method is more preferable. A specific example of the computation method of the score difference will be described later.

After Step S144 is completed, the VM migration determination unit 14 returns to Step S142 and attempts to compute score differences with regard to possible migration methods of migrating a virtual machine from another server device 3.

At Step S145, the VM migration determination unit 14 examines whether at least one score difference has been computed in the procedures from Steps S142 to S144 with regard to the possible migration methods. If this condition is met, the VM migration determination unit proceeds Step S146. Otherwise, the migration of the virtual machine fails, and the VM migration determination unit 14 ends its process of the VM migration determination procedures.

At Step S146, the VM migration determination unit 14 selects a migration method having the maxim value of the score differences computed from Steps S142 to S144.

Finally, in order to execute the migration method selected at S146, the VM migration determination unit 14 requests migration of the virtual machine to each of the server agent 31 on the server device 3 from which the virtual machine is to be migrated and the server agent 31 on the server device 3 to which the virtual machine is to be migrated (Step S147). The transfer of the virtual machine from one server device 3 to another can also be performed by using the known technology, the details of which are omitted.

Example of the Determination of the Possible Virtual Machine Migration Method

A specific example of the determination of the possible virtual machine transfer method at Step S144 will be described below.

Figure 11:
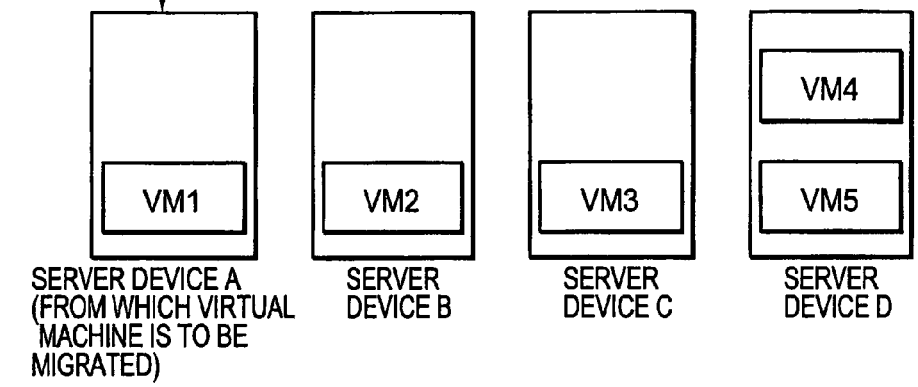
FIG. 11 is a diagram explanatory of a method of determining a possible migration method by the VM migration determination unit in the virtual machine management apparatus according to the first exemplary embodiment of the present invention.

FIG. 11 shows a situation in which possible migration methods for a virtual machine VM1 on a server device A are considered after the server device A has been taken at Step S143 as a server device 3 from which a virtual machine is to be migrated. Here, it is assumed that a virtual machine start request includes a condition requiring not less than 1 GB as an allocated memory usage for a service to be started ("blog service" in this example). Furthermore, it is assumed that each of server devices A-D has a physical memory of 1 GB and that a memory usage of 0.5 GB is allocated to each of the existing virtual machines VM1-VM5.

When only the allocated memory usage is regarded as a judgment criterion, the virtual machine VM1 on the server device A can be transferred to the server device B or C but cannot be transferred to the server device D. This is because two VMs each having an allocated memory usage of 0.5 GB have already been operated on the server device D.

Therefore, possible migration methods for the virtual machine VM1 on the server device A include the following two alternatives.

1) The virtual machine to be migrated: VM1; the server device to which the virtual machine is to be migrated: the server device B 2) The virtual machine to be migrated: VM1; the server device to which the virtual machine is to be migrated: the server device C For convenience of explanation, the above example only uses the allocated memory usage. In practice, however, possible virtual machine migration methods are examined in consideration of all other factors such as an allocated CPU usage ratio and the like.

Computation Example of the Score Difference

An example of the computation method of the score difference in Step S144 will be described below.

Figure 12:
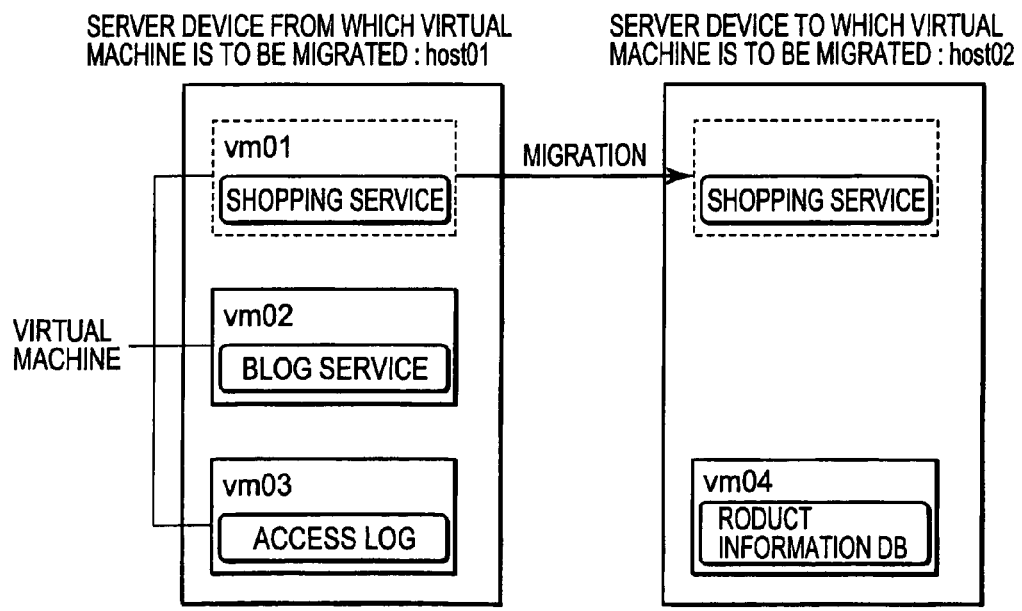
FIG. 12 is a diagram showing an example of computation of a score difference by the VM transfer determination unit in the virtual machine management apparatus according to the first exemplary embodiment of the present invention.

FIG. 12 shows an operation of migrating a virtual machine vm01 operated on a server device host01 to another server device host02. Three virtual machines vm01, vm02, and vm03 are operated on host01. A shopping service, a blog service, and an access log are operated on those virtual machines, respectively. A virtual machine vm04 is operated on host02, and a product information DB is operated thereon.

When the allocation rule table shown in FIG. 8 is applied, a score difference produced by transferring vm01 from host01 to host02 can be computed in the following manner.

1) The combination of the shopping service and the blog service has a score of −1. Accordingly, a score difference produced by removing vm01 from host01 is +1.

2) The combination of the shopping service and the access log has a score of +1. Accordingly, a score difference produced by removing vm01 from host01 is −1.

3) The combination of the shopping service and the product information DB has a score of −2. Accordingly, a score difference produced by adding vm01 to host02 is −2.

Thus, a total score difference of the migration of vm01 is (+1)+(−1)+(−2)=−2.

Effects of the First Exemplary Embodiment

Next, effects of a virtual machine management apparatus according to the present exemplary embodiment will be described below.

According to a virtual machine management apparatus of the present exemplary embodiment, a new virtual machine can be generated on a proper server device, i.e., on a server device on which a newly generated virtual machine can exert satisfactory performance with less adverse effects to other existing virtual machines. This is because a server device in which a combination of a new virtual machine and other existing virtual machines on the same server device is proper is selected as an allocation target for a new virtual machine.

Furthermore, according to a virtual machine management apparatus of the present exemplary embodiment, a probability of failure in generation of a new virtual machine can be lowered. This is because, if there is no server device that can ensure a resource required for a new virtual machine to be generated, then generation of a server device having a resource required for a new virtual machine to be generated is attempted by migrating an existing virtual machine to another server device. Particularly, a virtual machine management apparatus of the present exemplary embodiment determines a migration method of a virtual machine that can best improve appropriateness of allocation of virtual machines. Accordingly, proper reallocation of virtual machines can be achieved concurrently with the generation of a server device having a resource required for a new virtual machine to be generated.

Second Exemplary Embodiment

Figure 13:
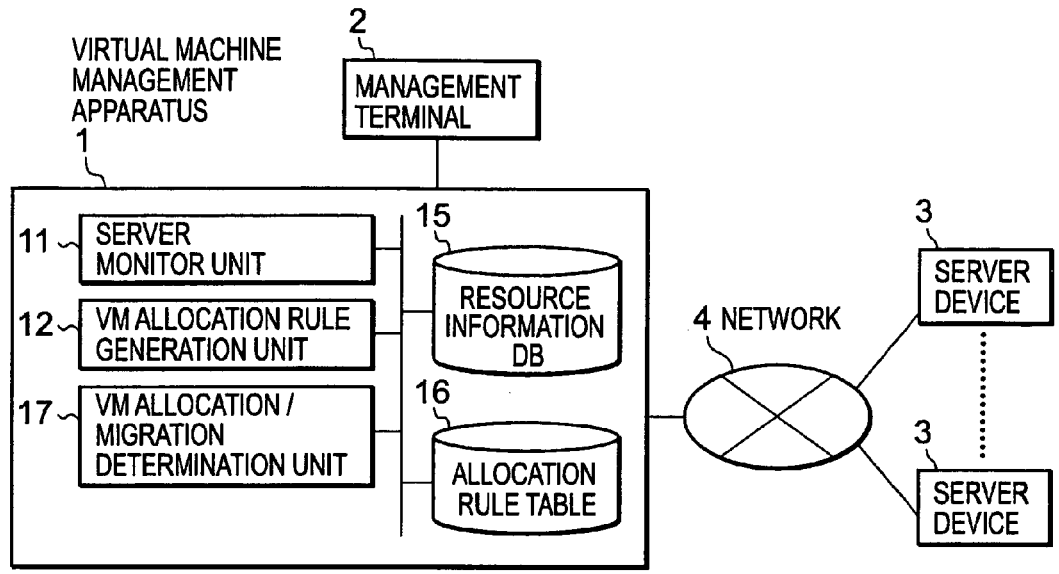
FIG. 13 is a block diagram of an information processing system including a virtual machine management apparatus according to a second exemplary embodiment of the present invention.

Referring to FIG. 13, as compared to the information processing system according to the first exemplary embodiment shown in FIG. 1, an information processing system according to a second exemplary embodiment of the present invention differs in that the virtual machine management apparatus 1 has a VM allocation/migration determination unit 17 instead of the VM allocation determination unit 13 and the VM migration determination unit 14.

In the virtual machine management apparatus of the information processing system in the first exemplary embodiment, when a new virtual machine is to be allocated, selection of an allocation target for a new virtual machine is first attempted from among server devices having enough resources in a group of all server devices at present. If such selection is impossible, then a proper server device is selected as an allocation target for a new virtual machine from among a group of server devices that do not have enough resources at present but can have enough resources if an existing virtual machine is migrated to another server device.

By contrast, the VM allocation/migration determination unit 17 of the virtual machine management apparatus 1 in the information processing system according to the present exemplary embodiment considers both of allocation methods involving no migration of an existing virtual machine and allocation methods involving migration of an existing virtual machine. An optimum allocation method is selected from among those methods. Here, the allocation methods that involve no migration of an existing virtual machine are methods of selecting an allocation target for a new virtual machine from among server devices having enough resources at present. The allocation methods that involve migration of an existing virtual machine are methods of selecting an allocation target for a new virtual machine that has enough resources from a server device from which an existing virtual machine has been migrated and a server device to which the existing virtual machine has been migrated, irrespective of the present resources.

Operation of the virtual machine management apparatus in the present exemplary embodiment will be described below with focusing on differences from the virtual machine management apparatus of the first exemplary embodiment.

Figure 14:
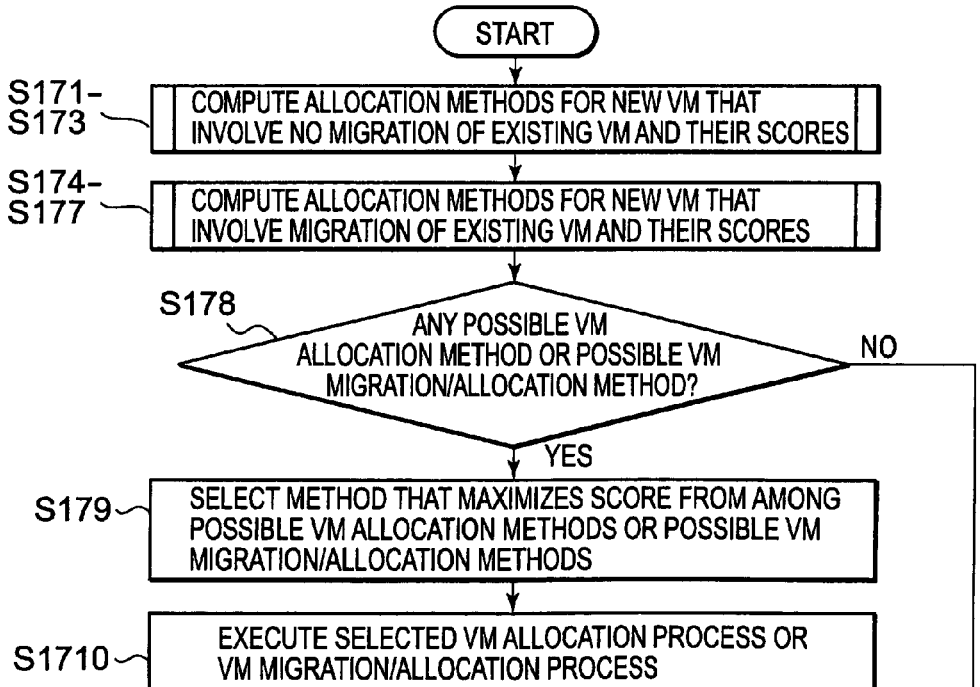
FIG. 14 is a flow chart showing operational procedures of a VM allocation/migration determination unit in the virtual machine management apparatus according to the second exemplary embodiment of the present invention.
Figure 15:
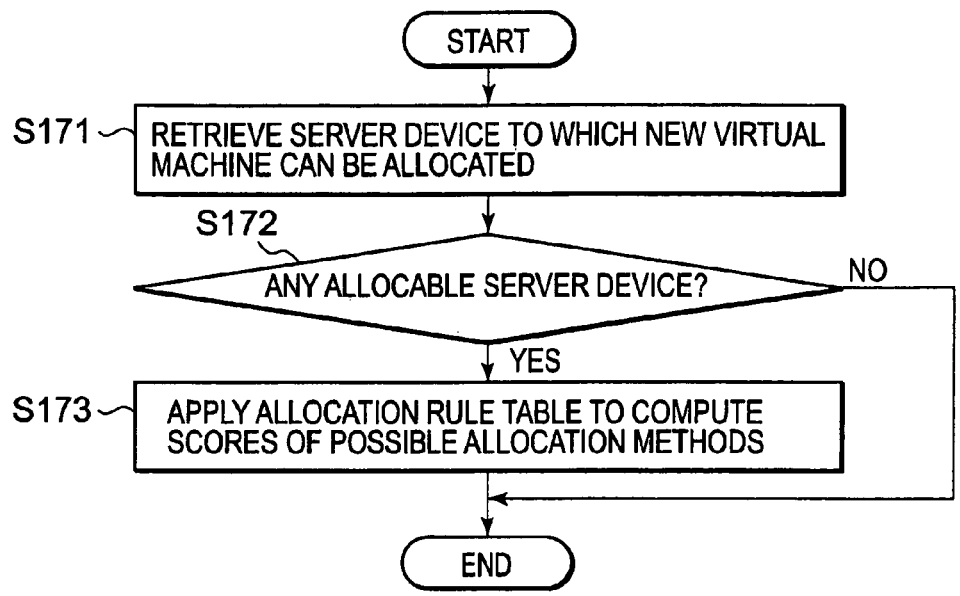
FIG. 15 is a flow chart showing detailed operational procedures of an allocation method for a new VM that involves no migration of an existing VM and computation of its score which are executed by the VM allocation/migration determination unit in the virtual machine management apparatus according to the second exemplary embodiment of the present invention.
Figure 16:
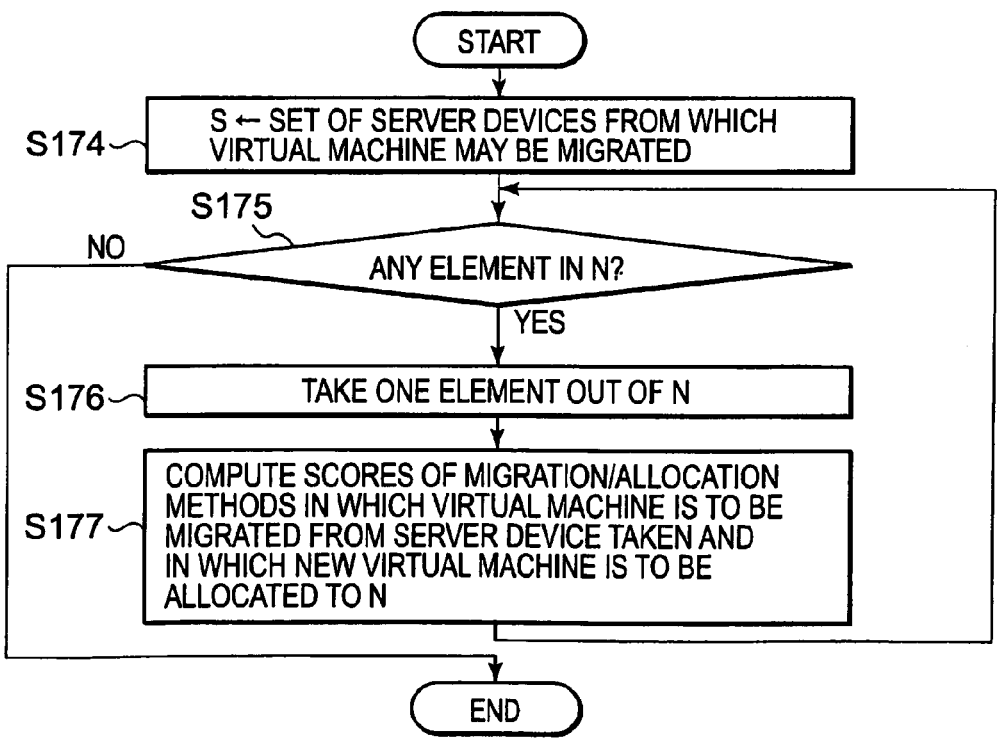
FIG. 16 is a flow chart showing detailed operational procedures of an allocation method for a new VM that involves migration of an existing VM and computation of its score which are executed by the VM allocation/migration determination unit in the virtual machine management apparatus according to the second exemplary embodiment of the present invention.

Operational Procedures of the VM Allocation/Migration Determination Unit 17 in the Second Exemplary Embodiment Referring to FIGS. 15, 15, and 16, operational procedures of the VM allocation/migration determination unit 17 of the virtual machine management apparatus 1 in the present embodiment will be described below. FIG. 14 is a flow chart showing the entire operation of the VM allocation/migration determination unit 17, and FIGS. 15 and 16 are flow charts showing the details of Steps S171-S173 and S174-S177 in FIG. 14.

First, the VM allocation/migration determination unit 17 generates possible server devices to which a new virtual machine is to be allocated on the assumption that no transfer of an existing virtual machine is involved and then computes their scores (Steps S171-S173). Those procedures include the following three steps.

The VM allocation/migration determination unit 17 first performs retrieval on the server device information and the virtual machine information stored in the resource information DB 15 and acquires a list of server devices that meet conditions included in the virtual machine start request (Step S171). This Step S171 is similar as Step S131 in the operational procedures (FIG. 9) by the VM allocation determination unit 13 in the first exemplary embodiment.

Next, the VM allocation/migration determination unit 17 examines whether the retrieval result of Step S171 includes one or more elements (Step S172). If this condition is met, the VM allocation/transfer determination unit proceeds Step S173. Otherwise, the VM allocation/migration determination unit proceeds Step S174.

At Step S173, the VM allocation/migration determination unit 17 applies the contents of the allocation rule table 16 and computes scores of each of possible server devices 3 for an allocation target. This process is similar as Step S133 of FIG. 9 by the VM allocation determination unit 13 in the first exemplary embodiment.

Next, the VM allocation/migration determination unit 17 generates possible migration/allocation methods including a combination of migation of an existing virtual machine and allocation of a new virtual machine and computes their scores (Steps S174-S177). This procedure includes the following steps.

First, the VM allocation/migration determination unit 17 generates a set N of possible server devices from which a virtual machine is to be migrated based on the server device information stored in the resource information DB 15 (Step S174). This process is similar as Step S141 in the operational procedures (FIG. 10) by the VM migration determination unit 14 in the first exemplary embodiment.

Next, the VM allocation/migration determination unit 17 examines whether at least one server device 3 is included in N (Step S175). If at least one server device 3 is included in N, then the VM allocation/migration determination unit proceeds Step S176. Otherwise, the VM allocation/migration determination unit proceeds Step S178.

At Step S176, the VM allocation/migration determination unit 17 takes information on a single server device 3 out of N and removes the taken information on the server device 3 from N (similar as Step S143 of FIG. 10).

Next, the VM allocation/migration determination unit 17 generates possible migration/allocation methods with regard to virtual machines 33 operated on the server device 3 taken in Step S176 and computes scores of those methods (Step S177).

Here, the migration/allocation method refers to an operation in which migration of an existing virtual machine and allocation of a new virtual machine are combined. A single migration/allocation method is specified by the following three elements.

a) A virtual machine to be migrated b) A server device to which the virtual machine is to be migrated c) A server device to which a new virtual machine is to be allocated A migration/allocation method should include an available migration method. In other words, a server device to which a virtual machine is to be migrated should have resources required to operate the virtual machine to be migrated. Furthermore, a server device to which a new virtual machine is to be allocated should have resources required to operate the new virtual machine. Here, a server device to which a new virtual machine is to be allocated may be a server device from which a migration target virtual machine is to be migrated or a server device to which a migration target virtual machine is to be migrated.

For each of the migration/allocation methods, the score is computed by the following method.

1) A score difference is computed for a migration method included in the migration/allocation method. The computation of this score difference is performed in the similar manner as in Step S144 of FIG. 10 in the first exemplary embodiment.

2) A score is computed for an allocation method for a new virtual machine which is included in the migration/allocation method. The computation of this score is performed in the similar manner as in Step S133 of FIG. 9 in the first exemplary embodiment.

3) The sum of the results of 1) and 2) is used as a score of the migration/allocation method.

At this Step S177, the VM allocation/migration determination unit 17 may not examine all possible migration/allocation methods but may use some heuristic methods to reduce the number of migration/allocation methods to be examined. An example of the heuristic methods will be described below.

a) The possibility is examined for all combinations of a virtual machine to be migrated and a server device to which the virtual machine is to be migrated.

b) A server device to which a new virtual machine is to be allocated is fixed to a server device from which a virtual machine is to be migrated (i.e., the server device taken out of N at Step S176).

After the completion of Step S177, the VM allocation/migration determination unit 17 returns to Step S175 and repeats the process following Step S175.

After the processes of Steps S174-S177 have been completed, the VM allocation/migration determination unit 17 examines whether there is any possible allocation method (which has been generated at Steps S171-S173) or any possible migration/allocation method (which has been generated at Steps S174-177) (Step S178). If this condition is met, the VM allocation/migration determination unit proceeds Step S179. If not, the VM allocation/migration determination unit fails in the allocation of the new virtual machine and thus ends its process.

At Step S179, the VM allocation/migration determination unit 17 selects a method that maximizes the score from among the possible allocation methods of the virtual machine or the possible migration/allocation methods. Here, the comparison may be performed in a manner other than a manner in which scores of the allocation methods involving no migration are compared directly to scores of the migration/allocation methods. For example, priority may be given to allocation methods involving no migration by adding a predetermined score to scores of the allocation methods involving no transfer.

Finally, the VM allocation/migration determination unit 17 executes the virtual machine allocation method or migration/allocation method selected in Step S179 (Step S1710). Here, if the selected operation is a migration/allocation method, then the VM allocation/migration determination unit 17 requests the server agents 31 to migrate the virtual machine 33 in the similar procedure as Step S147 of FIG. 10. Furthermore, the VM allocation/migration determination unit 17 requests the server agent 31 to start the virtual machine 33 in the similar procedure as Step S135 of FIG. 9, irrespective of migration of a virtual machine 33.

Figure 17:
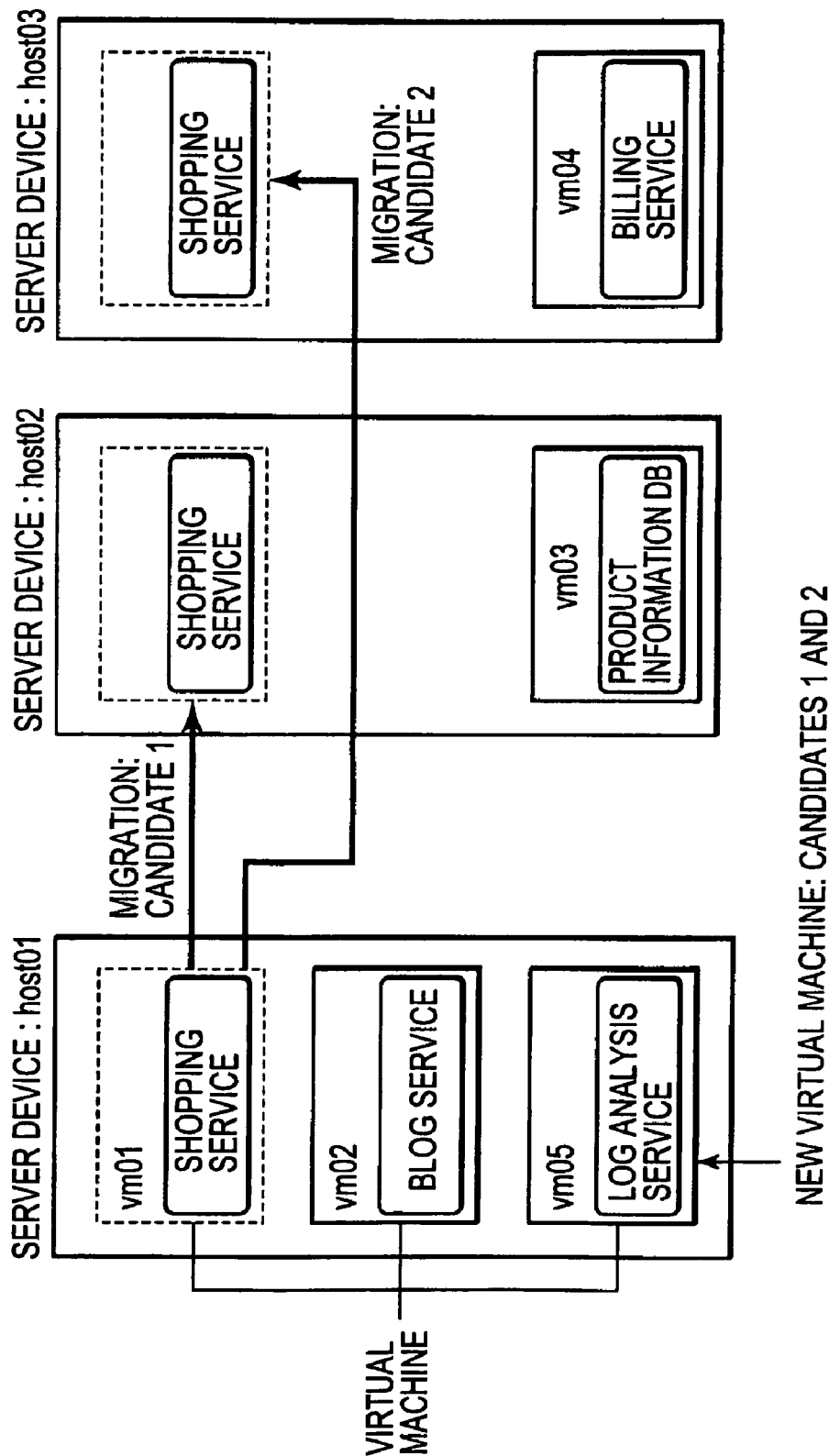
FIG. 17 is a diagram showing a specific example of an allocation method for a new VM that involves migration of an existing VM which is executed by the VM allocation/migration determination unit in the virtual machine management apparatus according to the second exemplary embodiment of the present invention.

FIG. 17 shows a specific example of a virtual machine migration/allocation operation according to the present procedures. This figure shows a state in which a new virtual machine vm05 is to be allocated in a system having three server devices 3 including host01, host02, and host03. Here, on the assumption that a new virtual machine is to be allocated to a server device 3 from which an existing virtual machine is to be migrated, migration/allocation methods including migration of the existing virtual machine vm01 include the following two types.

1) The virtual machine to be migrated: vm01; the server device to which the virtual machine is to be migrated: host02; the allocation target for the new virtual machine: host01

2) The virtual machine to be migrated: vm01; the server device to which the virtual machine is to be migrated: host03; the allocation target for the new virtual machine: host01

Effects of the Second Exemplary Embodiment

According to a virtual machine management apparatus of the present exemplary embodiment, a new virtual machine can be generated on a proper server device, i.e., on a server device on which a newly generated virtual machine can exert satisfactory performance with less adverse effects to other existing virtual machines. This is because a server device in which a combination of a new virtual machine and other existing virtual machines on the same server device is proper is selected as an allocation target for a new virtual machine.

Furthermore, according to a virtual machine management apparatus of the present exemplary embodiment, a probability of failure in generation of a new virtual machine can be reduced. This is because an allocation target for a new virtual machine is selected not only from server devices that can ensure a resource required for a new virtual machine to be generated, but also from server devices in which a resource required for a new virtual machine to be generated can be obtained by migrating an existing virtual machine to another server device.

Moreover, according to a virtual machine management apparatus of the present exemplary embodiment, when a virtual machine is to be newly allocated, migration of an existing virtual machine is attempted irrespective of whether the server device has an available resource required for a new virtual machine at present. Therefore, efficient resource allocation can be achieved.

Third Exemplary Embodiment

Figure 18:
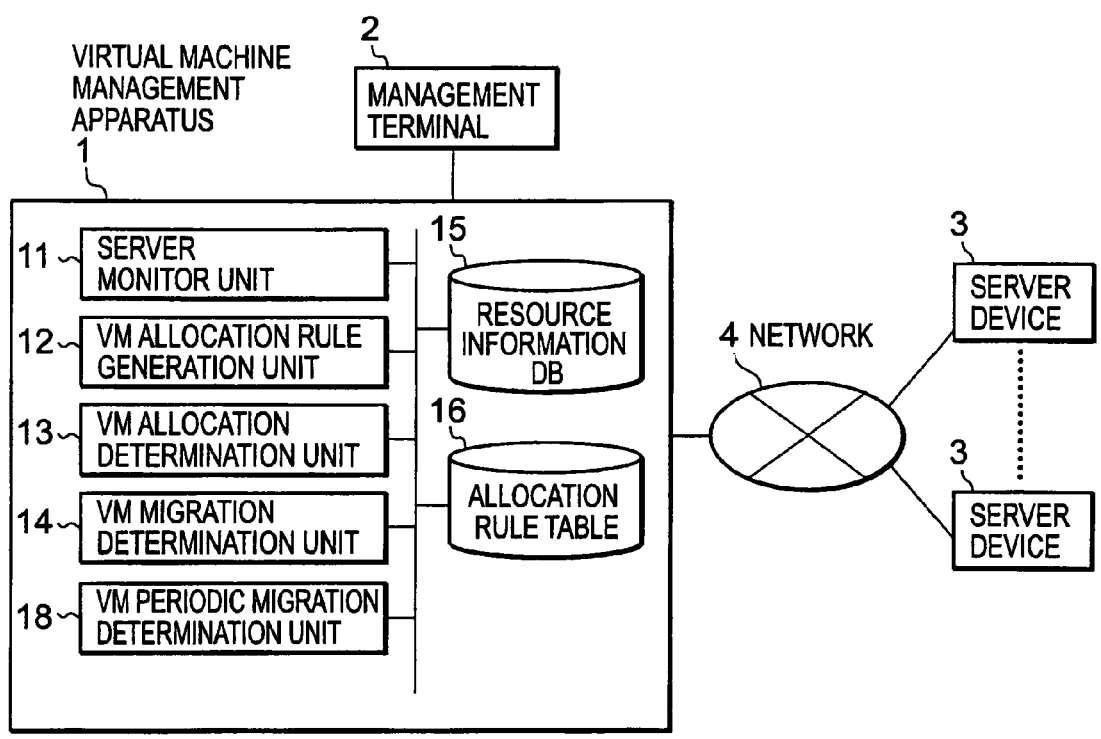
FIG. 18 is a block diagram of an information processing system including a virtual machine management apparatus according to a third exemplary embodiment of the present invention.

Referring to FIG. 18, as compared to the information processing system according to the first exemplary embodiment shown in FIG. 1, an information processing system according to a third exemplary embodiment of the present invention differs in that the virtual machine management apparatus 1 further includes a VM periodic migration determination unit 18.

In the virtual machine management apparatus 1 of the information processing system in the first exemplary embodiment, reallocation of an existing virtual machine is performed only when a new virtual machine is to be allocated. By contrast, the virtual machine management apparatus 1 of the information processing system according to the present exemplary embodiment performs reallocation of an existing virtual machine at predetermined intervals with the VM periodic migration determination unit 18 independently of allocation of a new virtual machine.

Operation of the virtual machine management apparatus in the present exemplary embodiment will be described below with focusing on differences from the virtual machine management apparatus of the first exemplary embodiment.

Operational Procedures of the VM Periodic Migration Determination Unit 18

Referring to a flow chat of FIG. 19, operational procedures of the VM periodic migration determination unit 18 of the virtual machine management apparatus 1 in the present exemplary embodiment will be described below.

Figure 19:
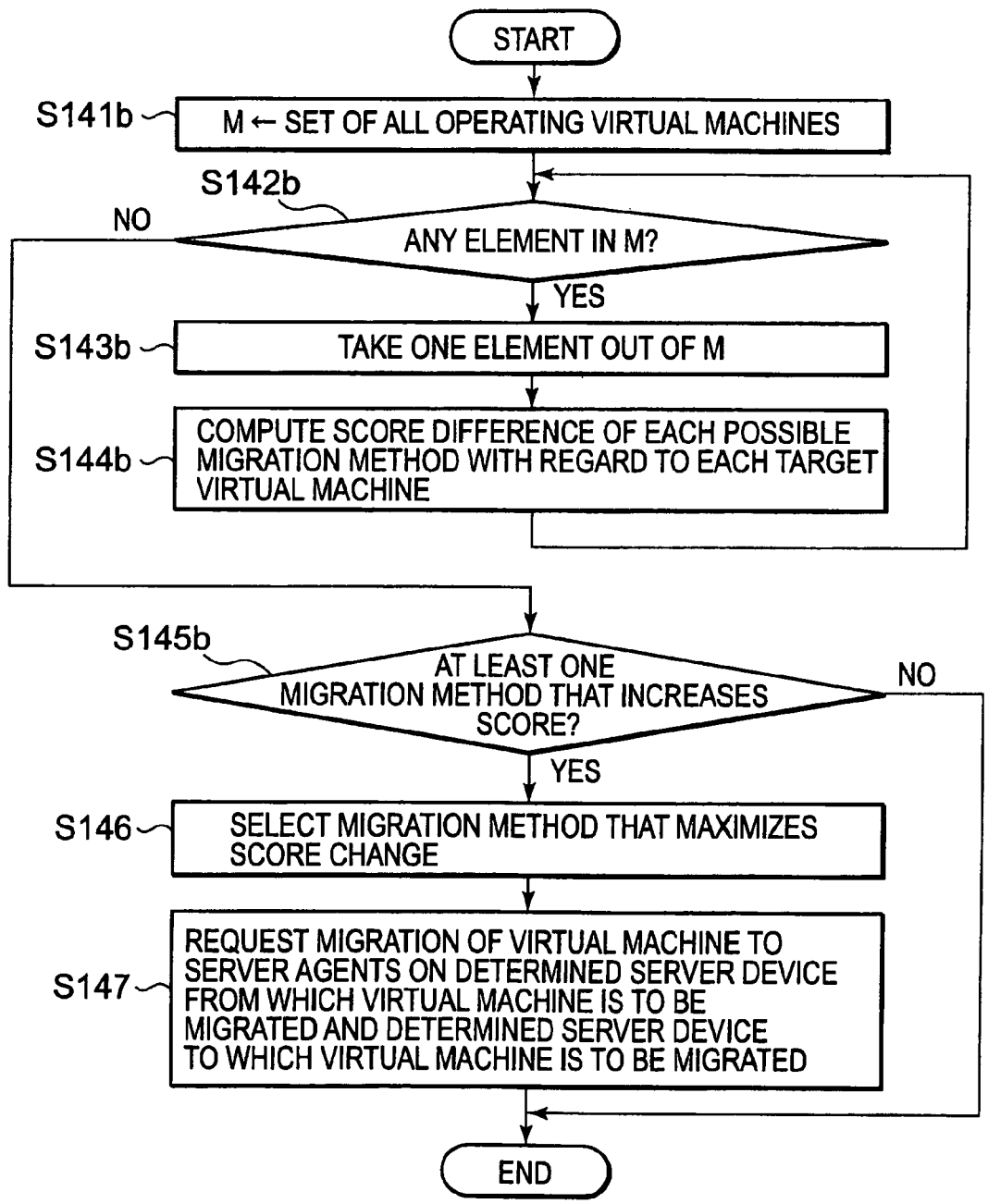
FIG. 19 is a flow chart showing operational procedures of a VM periodic migration determination unit in the virtual machine management apparatus according to the third exemplary embodiment of the present invention.

The VM periodic migration determination unit 18 restarts a process shown in FIG. 19 after a predetermined period of time has elapsed since the last completion of the process shown in FIG. 19.

First, the VM periodic migration determination unit 18 acquires a set of all operating virtual machines 33 with reference to the virtual machine information stored in the resource information DB 15 (Step S141b). This set of the virtual machines 33 is hereinafter denoted by M.

Next, the VM periodic migration determination unit 18 examines whether at least one virtual machine 33 is included in M (Step S142b). If this condition is met, the VM periodic migration determination unit proceeds Step S143b. Otherwise, the VM periodic migration determination unit proceeds Step S145b.

At Step S143b, the VM periodic migration determination unit 18 takes information on a single virtual machine 33 out of M. Furthermore, the VM periodic migration determination unit 18 removes the taken information on the virtual machine 33 from M.

Next, the VM periodic migration determination unit 18 computes a score difference of each of possible migration methods for the virtual machine taken at Step S143b (Step S144b). At this Step S144b, "possible migration methods" mean pairs of a virtual machine to be migrated and a server device to which the virtual machine is to be migrated which meet conditions on resources (a CPU usage ratio, a memory usage, and the like) used by services on all virtual machines operated on the server device to which the virtual machine is to be migrated. Furthermore, the computation of the score difference is performed in the similar manner as in the VM migration determination unit 14. After the completion of this step, the VM periodic migration determination unit returns to Step S142b.

At Step S145b, the VM periodic migration determination unit 18 examines whether at least one migration method having a score difference not less than a predetermined threshold value is included in the migration methods of which score differences are computed at Steps S142b-S144b. If this condition is met, the VM periodic migration determination unit proceeds Step S146. Otherwise, the VM periodic migration determination unit ends the current process. The threshold value used herein is a constant not smaller than 0 and is predetermined.

At Step S146, the VM periodic migration determination unit 18 selects a transfer method that maximizes the score difference from among at least one migration method having a score difference not less than the predetermined threshold value. The number of the migration methods selected in this Step S146 can be set as desired. One example of the selection method includes selecting a predetermined number of migration methods in descending order of the score difference. Another example of the selection method includes selecting all migration methods having a score difference not less than the threshold value used in Step S145b. Still another example of the selection method includes selecting a predetermined number of the migration methods having a score difference not less than the threshold value used in Step S145b and also selecting all migration methods having a score difference not less than another threshold value.

Finally, the VM periodic migration determination unit 18 requests execution of the selected migration method to the server agents 31 of the determined server device 3 from which the virtual machine is to be migrated and the determined server device 3 to which the virtual machine is to be migrated (Step S147). The operations in Steps S146 and S147 are the same as Steps S146 and S147 in the operational procedures (FIG. 10) of the VM migration determination unit 14.

Effects of the Third Exemplary Embodiment

According to a virtual machine management apparatus of the present exemplary embodiment, it is possible to obtain the similar effects as in the virtual machine management apparatus of the first exemplary embodiment. Furthermore, since reallocation of an operating virtual machine 33 is attempted at periodic intervals, resource allocation to virtual machines 33 can continuously be optimized. Accordingly, the performance of services operated on each virtual machine 33 can be improved.

The virtual machine management apparatus of the present exemplary embodiment can be modified in the following manner.

The VM periodic migration determination unit 18 performs the processes shown in FIG. 19 at predetermined intervals. However, the VM periodic migration determination unit 18 may start the processes shown in FIG. 19 when resources of the server devices 3 or the virtual machines 33 reach a predetermined condition.

Instead of the VM allocation determination unit 13 and the VM migration determination unit 14, the virtual machine management apparatus 1 may have the similar unit as the VM allocation/migration determination unit 17 in the second exemplary embodiment.

Fourth Exemplary Embodiment

Figure 20:
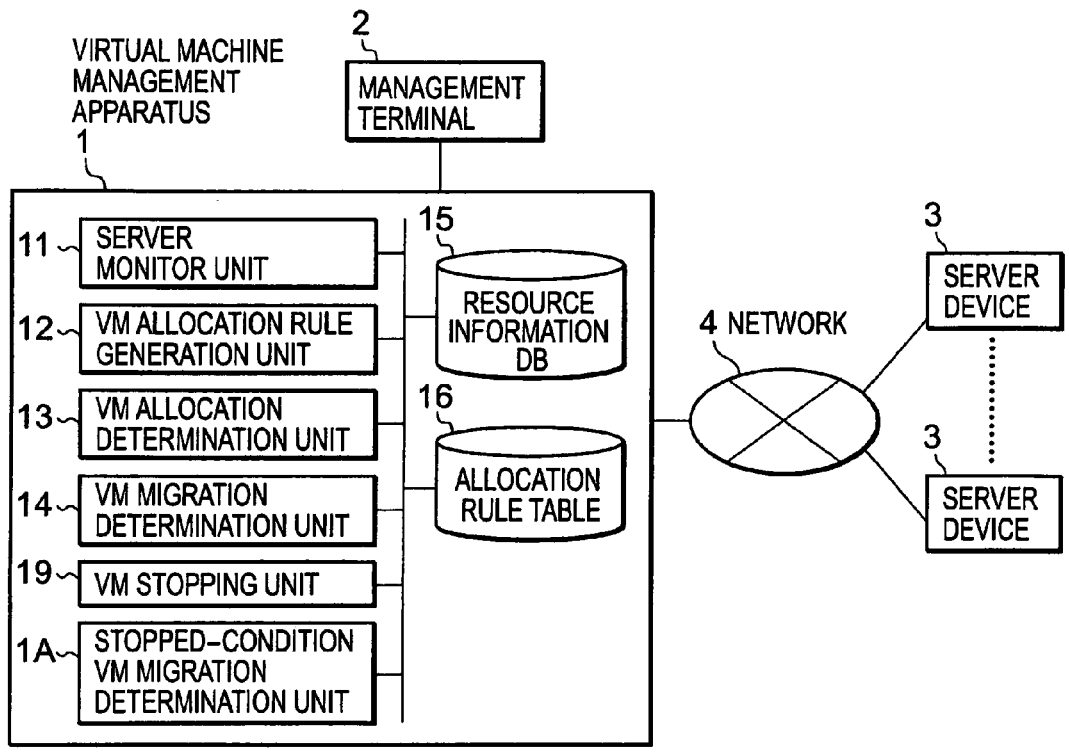
FIG. 20 is a block diagram showing a virtual machine management apparatus according to a fourth exemplary embodiment of the present invention.

Referring to FIG. 20, as compared to the information processing system according to the first exemplary embodiment shown in FIG. 1, an information processing system according to a fourth exemplary embodiment of the present invention differs in that the virtual machine management apparatus 1 further includes a VM stopping unit 19 and a stopped-condition VM migration determination unit 1A.

In the virtual machine management apparatus of the first exemplary embodiment, reallocation of an existing virtual machine is performed only when a new virtual machine is to be allocated. By contrast, the virtual machine management apparatus of the information processing system according to the present exemplary embodiment stops a virtual machine 33 on a server device 3 with the VM stopping unit 19 and, at that time, performs reallocation by migrating, with the stopped-condition VM migration determination unit 1A, a virtual machine 33 on another server device 3 to the server device 3 on which the virtual machine 33 is stopped.

Operation of the virtual machine management apparatus in the present exemplary embodiment will be described below with focusing on differences from the virtual machine management apparatus of the first exemplary embodiment.

Operational Procedures of the VM Stopping Unit 19

The VM stopping unit 19 receives a virtual machine stop request including a name of a virtual machine to be stopped from the management terminal 2. The VM stopping unit 19 has a function of stopping the virtual machine in accordance with the virtual machine stop request and of calling the stopped-condition VM migration determination unit 1A to migrate an existing virtual machine.

Figure 21:
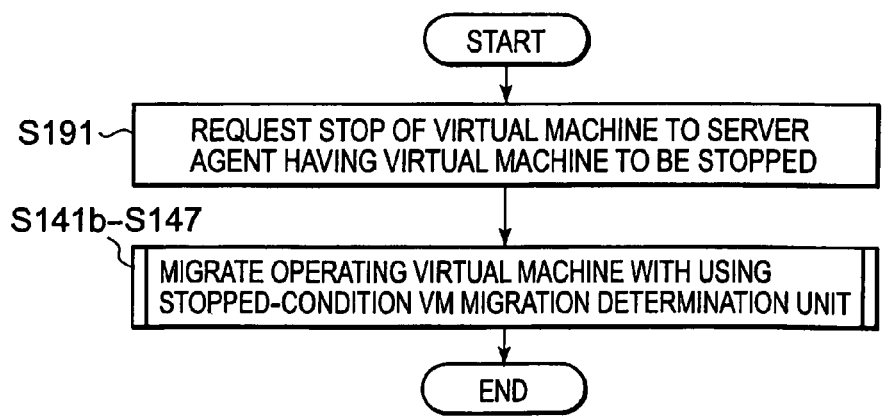
FIG. 21 is a flow chart showing operational procedures of a VM stopping unit in the virtual machine management apparatus according to the fourth exemplary embodiment of the present invention.

FIG. 21 is a flow chart showing operational procedures of the VM stopping unit 19 in the virtual machine management apparatus of the present exemplary embodiment. The details of the operational procedures will be described below.

First, the VM stopping unit 19 requests the server agent 31 on the server device 3 on which the virtual machine 33 to be stopped is operated to stop the virtual machine 33 (Step S191).

Next, the VM stopping unit 19 attempts to migrate an operating virtual machine 33 by using the stopped-condition VM migration determination unit 1A (Steps S141b-S147).

The operation of the stopped-condition VM migration determination unit 1A is similar as the operation of the VM periodic migration determination unit 18 in the third exemplary embodiment (FIG. 19) with the following exceptions.

1) In Step S141b, a set M of virtual machines 33 to be migrated does not include virtual machines 33 operated on the same server device 3 as the virtual machine 33 to be stopped.

2) In Step S144b, possible migration methods only include migration methods of migrating a virtual machine 33 to a server device 3 on which a virtual machine 33 to be stopped is operated.

Effects of the Fourth Exemplary Embodiment

According to a virtual machine management apparatus of the present exemplary embodiment, it is possible to obtain the similar effects as in the virtual machine management apparatus of the first exemplary embodiment. Furthermore, when a virtual machine 33 is stopped, reallocation of another virtual machine 33 is attempted. Accordingly, resource allocation to virtual machines 33 can be optimized. Therefore, the performance of services operated on each virtual machine 33 can be improved.

Instead of the VM allocation determination unit 13 and the VM migration determination unit 14, the virtual machine management apparatus 1 may have the similar unit as the VM allocation/migration determination unit 17 in the virtual machine management apparatus of the second exemplary embodiment or as the VM periodic migration determination unit 18 in the virtual machine management apparatus of the third exemplary embodiment.

While the exemplary embodiments of the present invention have been described above, the present invention is not limited to the aforementioned exemplary embodiments. Other various types of additions and changes can be made within the above exemplary embodiments. Furthermore, functions of a virtual machine management apparatus according to the present invention can be implemented by, as a matter of course, hardware or by a computer and a program. The program is stored in a computer-readable storage medium, such as a magnetic disk or a semiconductor memory, and provided via the computer-readable medium. The program is read by the computer, for example, when the computer is booted up. The program controls operations of the computer so that the computer serves as a virtual machine management apparatus as described in the above exemplary embodiments and executes the aforementioned processes.

Industrial Applicability

The present invention is applicable to use in operations management middleware for centrally managing server resources which form an enterprise information system. Furthermore, the present invention can be applied to use in resource management software for providing a hosting service or an application service provider (ASP) to lend server resources to a plurality of personal users or cooperate users.

The invention claimed is:

1. A virtual machine management apparatus connected to a plurality of server devices via a network, comprising:
   one or more computers, the one or more computers including:
   an allocation rule table that stores a plurality of scores, each score for each of combinations of types of virtual machines, each score indicating appropriateness of a condition that the combination of types of virtual machines is to be allocated to the same server device, each score being set for each of the combinations of any number of types of virtual machines among a plurality of the virtual machines, and each score being higher in a case of less resource conflicts and more communications with each other;
   a virtual machine allocation determination unit that: selects one or more server devices to which a new virtual machine can be allocated, computes an index value in a case where the new virtual machine is allocated to each of the selected server devices with use of the score, determines a sever device as an allocation target for the new virtual machine with reference to the computed index value that defines maximum value of the score differences, and selects the determined server device that can ensure a resource required for the new virtual machine at present as a server device to which the new virtual machine can be allocated; and
   a virtual machine migration determination unit that: selects a server device as an allocation target for the new virtual machine that can ensure a resource required at present from a sever device from which an existing virtual machine has been migrated and a server device to which the existing virtual machine has been migrated, irrespective of the present resource,
   wherein the virtual machine migration determination unit is called by the virtual machine allocation determination unit when there is no server device that can ensure a resource required for the new virtual machine at present.

2. The virtual machine management apparatus as recited in claim 1, comprising a migration unit that computes, for each of possible migration methods of migrating a virtual machine on one server device to another server device, an index value indicative of appropriateness of the migration method with reference to the score independently of the allocation of the new virtual machine, and migrates an existing virtual machine with reference to the computed index value.

3. The virtual machine management apparatus as recited in claim 2, wherein the migration unit operates at predetermined intervals, or each time a resource of a server device or a virtual machine reaches a predetermined condition, or each time a virtual machine is stopped.

4. The virtual machine management apparatus as recited in claim 1, wherein the virtual machine migration determination unit computes, for each of possible migration methods that can generate a server device to which the new virtual machine can be allocated, an index value of appropriateness of the migration method with reference to the score, and determines a transfer method for a virtual machine with reference to the computed index value.

5. The virtual machine management apparatus as recited in claim 1, comprising:
   a server monitor unit that collects, for each type of virtual machines, status of usage of a resource in the virtual machine and status of communication of the virtual machine with other virtual machines from a server device to which the type of virtual machines is allocated; and
   an allocation rule generation unit that generates the score from the information collected by the server monitor unit and a predetermined score generation rule to store the score in the allocation rule table.

6. A virtual machine management apparatus connected to a plurality of server devices via a network, comprising:
  one or more computers, the one or more computers including:
    an allocation rule table that stores a plurality of scores, each score for each of combinations of types of virtual machines, each score indicating appropriateness of a condition that the combination of types of virtual machines is to be allocated to the same server device, each score being set for each of the combinations of any number of types of virtual machines among the plurality of the virtual machines, and each score being higher in a case of less resource conflicts and more communications with each other; and
    a virtual machine allocation and migration determination unit that: selects possible allocation methods for a new virtual machine that involve no migration of an existing virtual machine and possible allocation methods for a new virtual machine that involve migration of an existing virtual machine, computes, for each of the selected possible allocation methods, an index value indicative of appropriateness of the allocation method with use of the score, and selects an allocation method from among the possible allocation methods involving no migration and the possible allocation methods involving migration with reference to the computed index value that defines maximum value of the score differences, and determines a server device as an allocation target for the new virtual machine with reference to the selected allocation method; and
  wherein the possible allocation methods that involve no migration of the existing virtual machine are methods of selecting an allocation target for the new virtual machine from among the plurality server devices having enough resources at present; and
  wherein the possible allocation methods that involve migration of the existing virtual machine are methods of selecting an allocation target for the new virtual machine that has enough resources from a server device from which an existing virtual machine has been migrated and a server device to which the existing virtual machine has been migrated, irrespective of the present resources.

7. The virtual machine management apparatus as recited in claim 6, comprising a migration unit that computes, for each of possible migration methods of migrating a virtual machine on one server device to another server device, an index value indicative of appropriateness of the migration method with reference to the score independently of the allocation of the new virtual machine, and migrates an existing virtual machine with reference to the computed index value.

8. The virtual machine management apparatus as recited in claim 7, wherein the migration unit operates at predetermined intervals, or each time a resource of a server device or a virtual machine reaches a predetermined condition, or each time a virtual machine is stopped.

9. The virtual machine management apparatus as recited in claim 6, comprising:
  a server monitor unit that collects, for each type of virtual machines, status of usage of a resource in the virtual machine and status of communication of the virtual machine with other virtual machines from a server device to which that type of virtual machines is allocated; and
  an allocation rule generation unit that generates the score from the information collected by the server monitor unit and a predetermined score generation rule to store the score in the allocation rule table.

10. A method of managing virtual machines on a plurality of server devices with a computer connected to the plurality of server devices via a network, comprising:
  a first step in which the computer selects one or more server devices to which a new virtual machine can be allocated;
  a second step in which the computer computes, for each of the selected server devices, an index value in a case where the new virtual machine is allocated to the selected server device with reference to a score for each of combinations of types of virtual machines from an allocation rule table, the score indicating appropriateness of a condition that the combination of types of virtual machines is to be allocated to the same server device, the score being set for each of the combinations of any number of types of visual machines among the plurality of the virtual machines, the score being higher in a case of less resource conflicts and more communications with each other; and
  a third step in which the computer determines a sever device as an allocation target for the new virtual machine with reference to the computed index value that defines maximum value of the score differences,
  wherein the first step comprises selecting the determined server device that can ensure a resource required for the new virtual machine at present as a server device to which the new virtual machine can be allocated,
  wherein the first step comprises attempting to selects a server device as an allocation target for the new virtual machine can be allocated that can ensure a resource required at present from a sever device from which an existing virtual machine has been migrated and a server device to which the existing virtual machine has been migrated when there is no server device that can ensure a resource required for the new virtual machine at present.

11. The virtual machine management method as recited in claim 10, further comprising a fourth step in which the computer computes, for each of possible migration methods of migrating a virtual machine on one server device to another server device, an index value indicative of appropriateness of the migration method with reference to the score independently of the allocation of the new virtual machine, and migrates an existing virtual machine with reference to the computed index value.

12. The virtual machine management method as recited in claim 11, wherein the fourth step is started at predetermined intervals, or each time a resource of a server device or a virtual machine reaches a predetermined condition, or each time a virtual machine is stopped.

13. The virtual machine management method as recited in claim 10, wherein the first step comprises computing, for each of possible migration methods that can generate a server device to which the new virtual machine can be allocated, an index value of appropriateness of the migration method with reference to the score, and determining a migration method for a virtual machine with reference to the computed index value.

14. The virtual machine management method as recited in claim 10, further comprising:
  a fifth step in which the computer collects, for each type of virtual machines, status of usage of a resource in the virtual machine and status of communication of the virtual machine with other virtual machines from a server device to which that type of virtual machines is allocated; and a sixth step in which the computer generates the score from the collected information and a predetermined score generation rule and stores the score in the allocation rule table.

15. A method of managing virtual machines on a plurality of server devices with a computer connected to the plurality of server devices via a network, comprising:
a first step in which the computer selects possible allocation methods for a new virtual machine that involve no migration of an existing virtual machine and possible allocation methods for a new virtual machine that involve migration of an existing virtual machine;
a second step in which the computer computes, for each of the selected possible allocation methods, an index value indicative of appropriateness of the allocation method with reference to a score for each of combinations of types of virtual machines from an allocation rule table, the score indicating appropriateness of a condition that the combination of types of virtual machines is to be allocated to the same server device, the score being set for each of the combinations of any number of types of virtual machines among the plurality of the virtual machines, the score being higher in a case of less resource conflicts and more communications with each other, and selects an allocation method from among the possible allocation methods involving no migration and the possible allocation methods involving migration with reference to the computed index value that defines maximum value of the score differences; and
a third step in which the computer determines a server device as an allocation target for the new virtual machine with reference to the selected allocation method; and
wherein the possible allocation methods that involve no migration of the existing virtual machine are methods of selecting an allocation target for the new virtual machine from among the plurality server devices having enough resources at present; and
wherein the possible allocation methods that involve migration of the existing virtual machine are methods of selecting an allocation target for the new virtual machine that has enough resources from a server device from which an existing virtual machine has been migrated and a server device to which the existing virtual machine has been migrated, irrespective of the present resources.

16. The virtual machine management method as recited in claim 15, further comprising a fourth step in which the computer computes, for each of possible migration methods of migrating a virtual machine on one server device to another server device, an index value indicative of appropriateness of the migration method with reference to the score independently of the allocation of the new virtual machine, and migrates an existing virtual machine with reference to the computed index value.

17. The virtual machine management method as recited in claim 16, wherein the fourth step is started at predetermined intervals, or each time a resource of a server device or a virtual machine reaches a predetermined condition, or each time a virtual machine is stopped.

18. The virtual machine management method as recited in claim 15, further comprising:
a fifth step in which the computer collects, for each type of virtual machines, status of usage of a resource in the virtual machine and status of communication of the virtual machine with other virtual machines from a server device to which that type of virtual machines is allocated; and a sixth step in which the computer generates the score from the collected information and a predetermined score generation rule and stores the score in the allocation rule table.

19. A non-transitory computer readable recording medium storing a program for allowing a computer connected to a plurality of server devices via a network to perform:
a first process of selecting one or more server devices to which a new virtual machine can be allocated;
a second process of computing, for each of the selected server devices, an index value in a case where the new virtual machine is allocated to the selected server device with reference to a score for each of combinations of types of virtual machines from an allocation rule table, the score indicating appropriateness of a condition that the combination of types of virtual machines is to be allocated to the same server device, the score being set for each of the combinations of any number of types of virtual machines among the plurality of the virtual machines, the score being higher in a case of less resource conflicts and more communications with each other; and
a third process of determining a sever device as an allocation target for the new virtual machine with reference to the computed index value that defines maximum value of the score differences,
wherein the first process comprises selecting the determined server device that can ensure a resource required for the new virtual machine at present as a server device to which the new virtual machine can be allocated,
wherein the first process comprises attempting to selects a server device as an allocation target for the new virtual machine can be allocated that can ensure a resource required at present from a sever device from which an existing virtual machine has been migrated and a server device to which the existing virtual machine has been migrated when there is no server device that can ensure a resource required for the new virtual machine at present.

20. The non-transitory computer readable recording medium as recited in claim 19, wherein the program allows the computer to further perform a fourth process of computing, for each of possible migration methods of migrating a virtual machine on one server device to another server device, an index value indicative of appropriateness of the migration method with reference to the score independently of the allocation of the new virtual machine, and of migrating an existing virtual machine with reference to the computed index value.

21. The non-transitory computer readable recording medium as recited in claim 20, wherein the fourth process is started at predetermined intervals, or each time a resource of a server device or a virtual machine reaches a predetermined condition, or each time a virtual machine is stopped.

22. The non-transitory computer readable recording medium as recited in claim 19, wherein the first process comprises computing, for each of possible migration methods that can generate a server device to which the new virtual machine can be allocated, an index value of appropriateness of the migration method with reference to the score, and determining a migration method for a virtual machine with reference to the computed index value.

23. The non-transitory computer readable recording medium as recited in claim 19, wherein the program allows the computer to further perform:
a fifth process of collecting, for each type of virtual machines, status of usage of a resource in the virtual machine and status of communication of the virtual machine with other virtual machines from a server device to which that type of virtual machines is allocated; and a sixth process of generating the score from the collected information and a predetermined score generation rule and stores the score in the allocation rule table.

24. A non-transitory computer readable recording medium storing a program for allowing a computer connected to a plurality of server devices via a network to perform:

a first process of selecting possible allocation methods for a new virtual machine that involve no migration of an existing virtual machine and possible allocation methods for a new virtual machine that involve transfer of an existing virtual machine;

a second process of computing, for each of the selected possible allocation methods, an index value indicative of appropriateness of the allocation method with reference to a score for each of combinations of types of virtual machines from an allocation rule table, the score indicating appropriateness of a condition that the combination of types of virtual machines is to be allocated to the same server device, the score being set for each of the combinations of any number of types of virtual machines among the plurality of the virtual machines, the score being higher in a case of less resource conflicts and more communications with each other, and selecting an allocation method from among the possible allocation methods involving no migration and the possible allocation methods involving migration with reference to the computed index value that defines maximum value of the score differences; and a third process of determining a server device as an allocation target for the new virtual machine with reference to the selected allocation method; and wherein the possible allocation methods that involve no migration of the existing virtual machine are methods of selecting an allocation target for the new virtual machine from among the plurality server devices having enough resources at present; and wherein the possible allocation methods that involve migration of the existing virtual machine are methods of selecting an allocation target for the new virtual machine that has enough resources from a server device from which an existing virtual machine has been migrated and a server device to which the existing virtual machine has been migrated, irrespective of the present resources.

25. The non-transitory computer readable recording medium as recited in claim 24, wherein the program allows the computer to further perform a fourth process of computing, for each of possible migration methods of migrating a virtual machine on one server device to another server device, an index value indicative of appropriateness of the migration method with reference to the score independently of the allocation of the new virtual machine, and of migrating an existing virtual machine with reference to the computed index value.

26. The non-transitory computer readable recording medium as recited in claim 25, wherein the fourth process is started at predetermined intervals, or each time a resource of a server device or a virtual machine reaches a predetermined condition, or each time a virtual machine is stopped.

27. The non-transitory computer readable recording medium as recited in claim 24, wherein the program allows the computer to further perform:

a fifth process of collecting, for each type of virtual machines, status of usage of a resource in the virtual machine and status of communication of the virtual machine with other virtual machines from a server device to which that type of virtual machines is allocated; and a sixth process of generating the score from the collected information and a predetermined score generation rule and stores the score in the allocation rule table.

* * * * *